United States Patent
Dash et al.

(10) Patent No.: US 11,540,668 B2
(45) Date of Patent: Jan. 3, 2023

(54) TOASTER DEVICE

(71) Applicant: StoreBound LLC, New York, NY (US)

(72) Inventors: Evan Marc Dash, New York, NY (US);
Shelby Scott, New York, NY (US);
Zhenni Chen, Shenzhen (CN); Yiyang Zhang, Shenzhen (CN)

(73) Assignee: StoreBound LLC

( * ) Notice: Subject to any disclaimer, the term of this patent is extended or adjusted under 35 U.S.C. 154(b) by 15 days.

(21) Appl. No.: 17/192,647

(22) Filed: Mar. 4, 2021

(65) Prior Publication Data

US 2021/0282594 A1 Sep. 16, 2021

(30) Foreign Application Priority Data

Mar. 13, 2020 (CN) ................... CN202010173031.2

(51) Int. Cl.
*A47J 37/08* (2006.01)
*A47J 36/32* (2006.01)
*H05B 1/02* (2006.01)

(52) U.S. Cl.
CPC .......... *A47J 37/0871* (2013.01); *A47J 36/32* (2013.01); *A47J 37/0814* (2013.01); *H05B 1/0261* (2013.01)

(58) Field of Classification Search
CPC .... A47J 37/08; A47J 37/0807; A47J 37/0814; A47J 37/0842; A47J 37/085; A47J 37/0857; A47J 37/0871; A47J 37/0878; A47J 37/0885; A47J 36/06; A47J 36/32; H05B 1/0261
USPC ................. 99/385, 387, 389–394, 401, 402
See application file for complete search history.

(56) References Cited

U.S. PATENT DOCUMENTS

| | | | | |
|---|---|---|---|---|
| 2,320,951 A | * | 6/1943 | Russell ................... | A47J 37/08 99/389 |
| 2,659,295 A | * | 11/1953 | Soccoli ............... | A47J 37/0878 99/339 |
| 3,074,342 A | * | 1/1963 | Wachtel ............. | A47J 37/0878 99/339 |
| 3,603,242 A | * | 9/1971 | Murphy, Sr. ........ | A47J 37/0878 99/339 |
| 5,528,980 A | | 6/1996 | McClean | |
| 5,724,886 A | | 3/1998 | Ewald et al. | |

(Continued)

FOREIGN PATENT DOCUMENTS

| | | |
|---|---|---|
| AU | 9229776 | 2/1996 |
| EP | 0034463 | 11/1984 |

*Primary Examiner* — Hung D Nguyen
(74) *Attorney, Agent, or Firm* — Belles Katz LLC

(57) ABSTRACT

Systems, methods, and devices may include a toaster device. The toaster may include a toaster body having a housing having a top outer surface, a bottom outer surface, and a side outer surface extending between the top and bottom outer surfaces. The toaster device may include a control system comprising a power supply and a switch configured to cut power to the heating element when in a cut-power state. The toaster device may include a toaster cover comprising an actuation element. The toaster cover may be alterable between a detached state in which the toaster cover is separated and remote from the toaster body and an assembled state in which the toaster cover rests atop the toaster body to cover the bread slot and the actuation element of the toaster cover actuates the switch into the cut-power state.

19 Claims, 18 Drawing Sheets

(56) References Cited

U.S. PATENT DOCUMENTS

| | | | |
|---|---|---|---|
| 6,244,166 B1 * | 6/2001 | Lebron | A47J 37/08 |
| | | | 99/385 |
| 6,581,512 B1 | 6/2003 | Mauffrey et al. | |
| 6,637,322 B2 | 10/2003 | Veltrop | |
| 6,657,168 B1 | 12/2003 | Lazzer | |
| 6,973,871 B1 | 12/2005 | Chuang et al. | |
| D761,610 S | 7/2016 | Carpenter et al. | |
| 2005/0204927 A1 | 9/2005 | Boyle et al. | |
| 2009/0139409 A1 | 6/2009 | Hall et al. | |
| 2009/0272279 A1 * | 11/2009 | Kieck | A47J 47/10 |
| | | | 99/468 |
| 2011/0185918 A1 | 8/2011 | Zhang et al. | |

* cited by examiner

TOASTER DEVICE

CROSS-REFERENCE TO RELATED PATENT APPLICATIONS

The present application claims priority to Chinese Patent Application No. 2020101730312, filed Mar. 13, 2020. The disclosure of the aforementioned priority application is incorporated herein by reference in its entirety.

BACKGROUND

Toasting a food, such as sliced bread, by exposing it to radiant heat is known. Devices for toasting a food may include pop-up toasters, toaster ovens, and conveyor belt toasters. While toaster ovens and conveyor belt toasters are typically used in a restaurant or similar catering environment, the pop-up toaster is typically used in a residential setting. The pop-up toaster is a mechanical device having vertical slots in which a slice of bread or other similar foodstuff is placed. A lever on the side of the toaster is depressed, thereby moving a seat on which the slice of bread slice is placed. As the seat moves downward the slice of bread is exposed to heating elements disposed on one or more sides of the slice of bread. The bread is heated for a predetermined period of time, at the completion of which the seat is released and the slice of bread is moved upwards such that the bread is partially exposed from the slot.

Although toasters are known, conventional pop-up toasters suffer from multiple disadvantages. For example, the slots of conventional pop-up toasters are typically exposed during non-use of the toaster, which may be aesthetically unappealing and may allow for unwanted particles to enter the vertical slots of the toaster. A tray may be used with the foodstuff derived from the pop-up toaster but obtaining such tray may be inconvenient for a user and may take additional storage that can be used for other kitchen essentials. Further, placing something upon the toaster (such as a tray) while the toaster is in use can cause the toaster to overheat, which can result in a burning of the foodstuff and a fire in the kitchen. Examples described herein overcome the disadvantages described above, as well as others.

BRIEF SUMMARY

Systems, methods, and devices may include a toaster device. The toaster may include a toaster body having a housing having a top outer surface, a bottom outer surface, and a side outer surface extending between the top and bottom outer surfaces; a bread slot in the top outer surface of the housing through which a bread can pass; a heating chamber in the housing below the bread slot; a heating element configured to generate heat in the heating chamber when receiving power from a power supply; an elevator assembly comprising an elevator positioned in the heating chamber for supporting the bread, the elevator movable along an elevator axis between a raised position in which the bread at least partially protrudes through the bread slot and a lowered position in which the bread is fully below the bread slot; and a control system comprising the power supply and a switch configured to cut power to the heating element when in a cut-power state. The toaster device may include a toaster cover comprising an actuation element. The toaster cover may be alterable between a detached state in which the toaster cover is separated and remote from the toaster body; and an assembled state in which the toaster cover rests atop the toaster body to cover the bread slot and the actuation element of the toaster cover actuates the switch into the cut-power state.

In an aspect, the toaster cover may include a tray body having a basin floor and a basin wall extending from the basin floor to collectively define a basin. The basin wall may form a continuous wall that circumscribes the basin floor. In an aspect, the housing of the toaster body may include a shoulder in the side outer surface that circumscribes the housing. The shoulder may separate the housing into an upper portion located above the shoulder and a lower portion located below the shoulder. In the assembled state, a distal edge of the basin wall contacts the shoulder of the housing of the toaster body and the upper portion of the housing of the toaster body extends into the basin.

In an aspect, the basin wall may include an inner wall surface and an outer wall surface. In the assembled state, the outer wall surface of the basin wall may be substantially flush with the side outer surface of the lower portion of the toaster body. In an aspect, the actuation element of the toaster cover may include a first protuberance extending from the basin floor. The top surface of the housing of the toaster body may include an aperture. The switch may include a switch actuator located below and aligned with the aperture along a switch axis.

In an aspect, the basin wall may extend a first height from the basin floor and the first protuberance extends a second height from the basin floor. The first height may be greater than the second height. In an aspect, the switch actuator may be alterable between a raised position and a lowered position by moving along the switch axis. The lowered position of the switch actuator may correspond to the cut-power state of the switch. The switch actuator may be biased into the raised state by a resilient element of the switch. The resilient element of the switch may be configured so that the weight of the toaster cover in the assembled state overcomes the biasing force of the resilient element. The switch axis may be substantially parallel to the elevator axis. The protuberance of the toaster may move in a direction along the switch axis as the toaster cover is altered from the detached state to the assembled state.

In an aspect, the toaster cover may include a transverse cross-sectional profile having a major axis and a minor axis that is shorter than the major axis. The toaster cover may be configured so that the toaster cover can be positioned into the assembled state in only a first rotational orientation and a second rotational orientation that is different than the first rotational orientation. The actuation element may include a first protuberance located on the toaster cover so that when the toaster cover is in the assembled state in the first rotational orientation, the first protuberance actuates the switch into the cut-power state; and a second protuberance located on the toaster cover so that when the toaster cover is in the assembled state in the second rotational orientation, the second protuberance actuates the switch into the cut-power state.

In an aspect, the elevator assembly may be configured to electrically couple the heating element to the power supply when the elevator is in the lowered position and decouple the heating element from the power supply when the elevator is in the raised position. The control system further may be configured to return the elevator from the lowered position to the raised position when the switch is in the cut-power state. The elevator assembly may include a resilient element that biases the elevator into the raised position; and a first latch component alterable between a locked state that locks the elevator in the lowered position and an unlocked state that releases the elevator to return to the raised position from the lowered position. The control system may be configured to alter the first latch component between the locked state when the switch is not in the cut-power state and the unlocked state when the switch is in the cut-power state. In an aspect, the elevator assembly may include a second latch component that operably cooperates with the first latch component.

In an aspect, the control system further comprising an electromagnetic solenoid. The first latch component may include a ferromagnetic element. The electromagnetic solenoid may be configured to exert a first magnetic field that acts upon the ferromagnetic element to cause the first latch component to be in the locked state when receiving a first amount of power from the power supply. The control system may be configured to: provide the first amount of power to the electromagnetic solenoid from the power supply in a normal operation state of the toaster device; and reduce power supplied to the electromagnetic solenoid to an amount below the first amount of power so that the first magnetic field is reduced and the first latch component assumes the unlocked state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
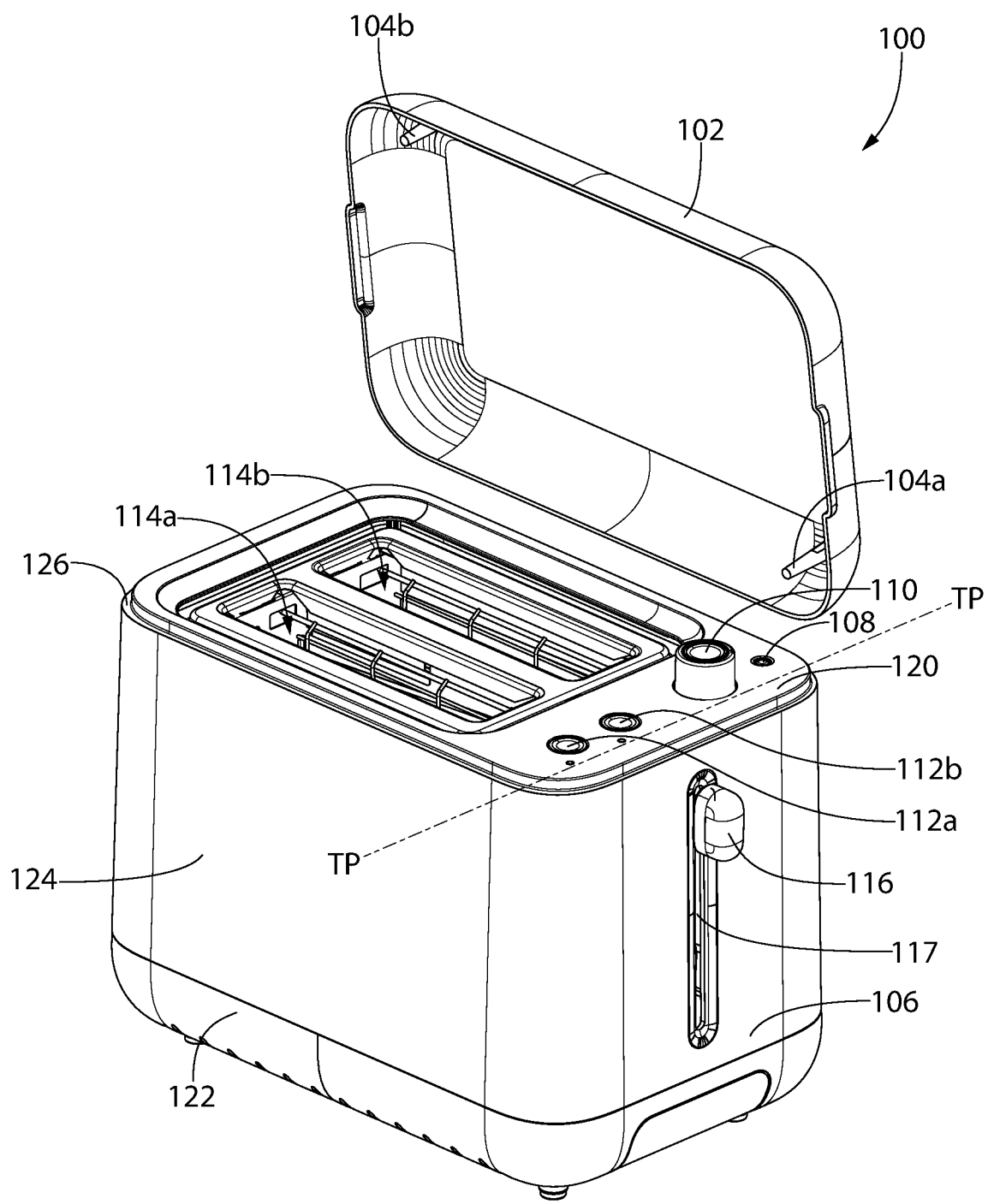
FIG. 1 is a perspective view of an example device for heating and dispensing a foodstuff in which the cover is separated from the body, as described herein.
Figure 2:
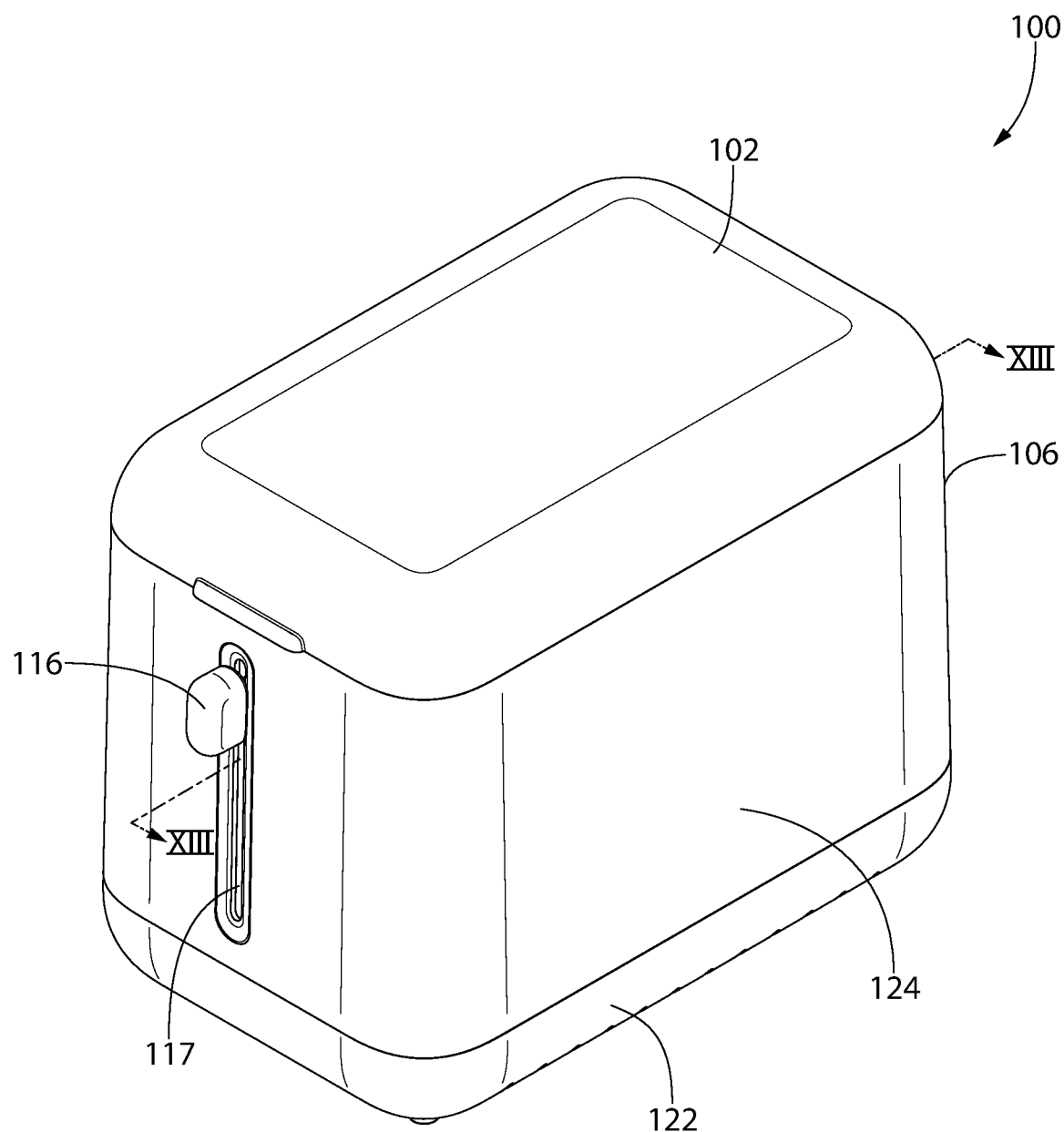
FIG. 2 is a perspective view of an example device for heating and dispensing a foodstuff in which the cover is placed upon the body, as described herein.
Figure 3:
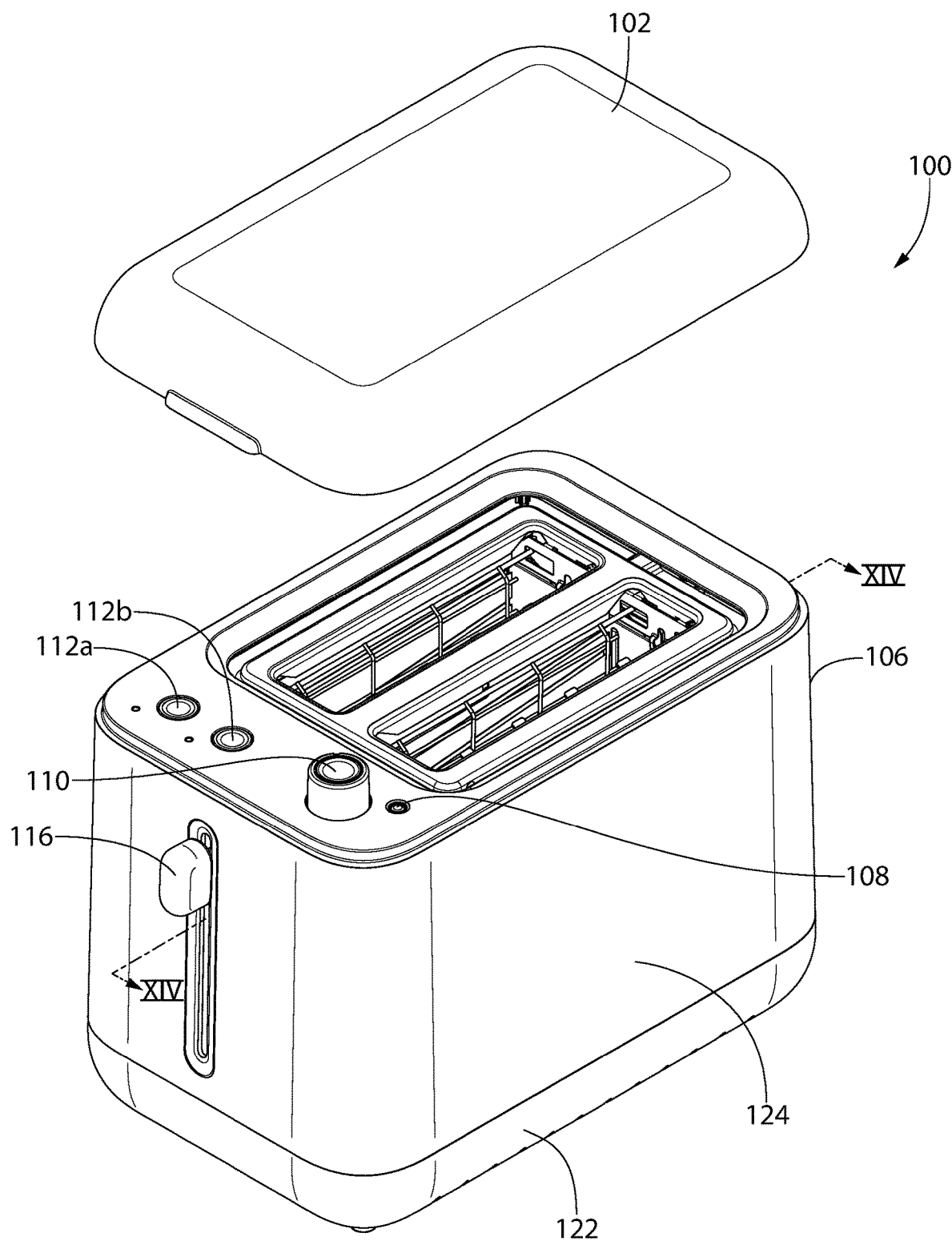
FIG. 3 is another perspective view of an example device for heating and dispensing a foodstuff in which the cover is separated from the body, as described herein
Figure 4:
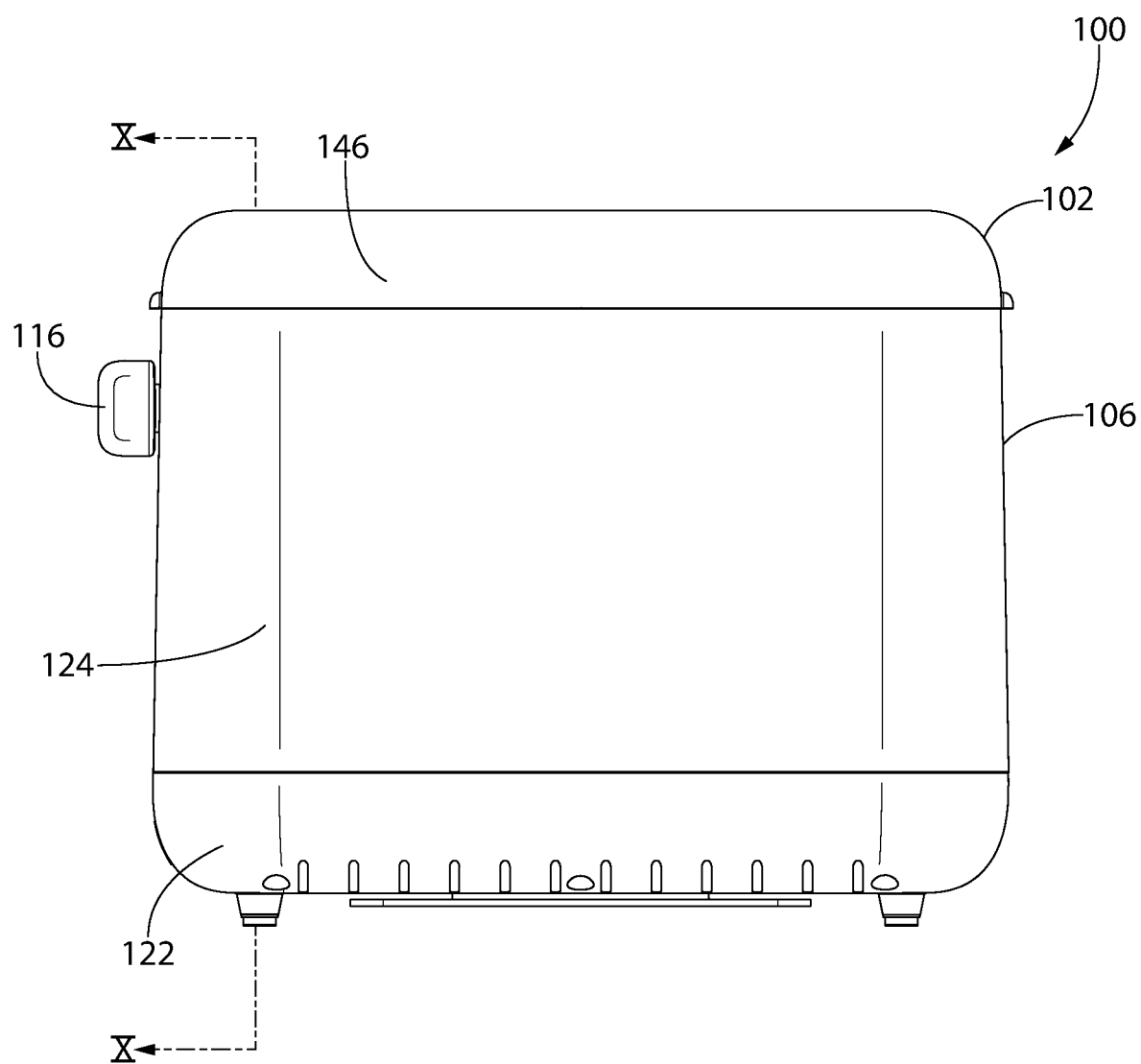
FIG. 4 is a side view of an example device for heating and dispensing a foodstuff in which the cover is placed upon the body, as described herein.
Figure 5:
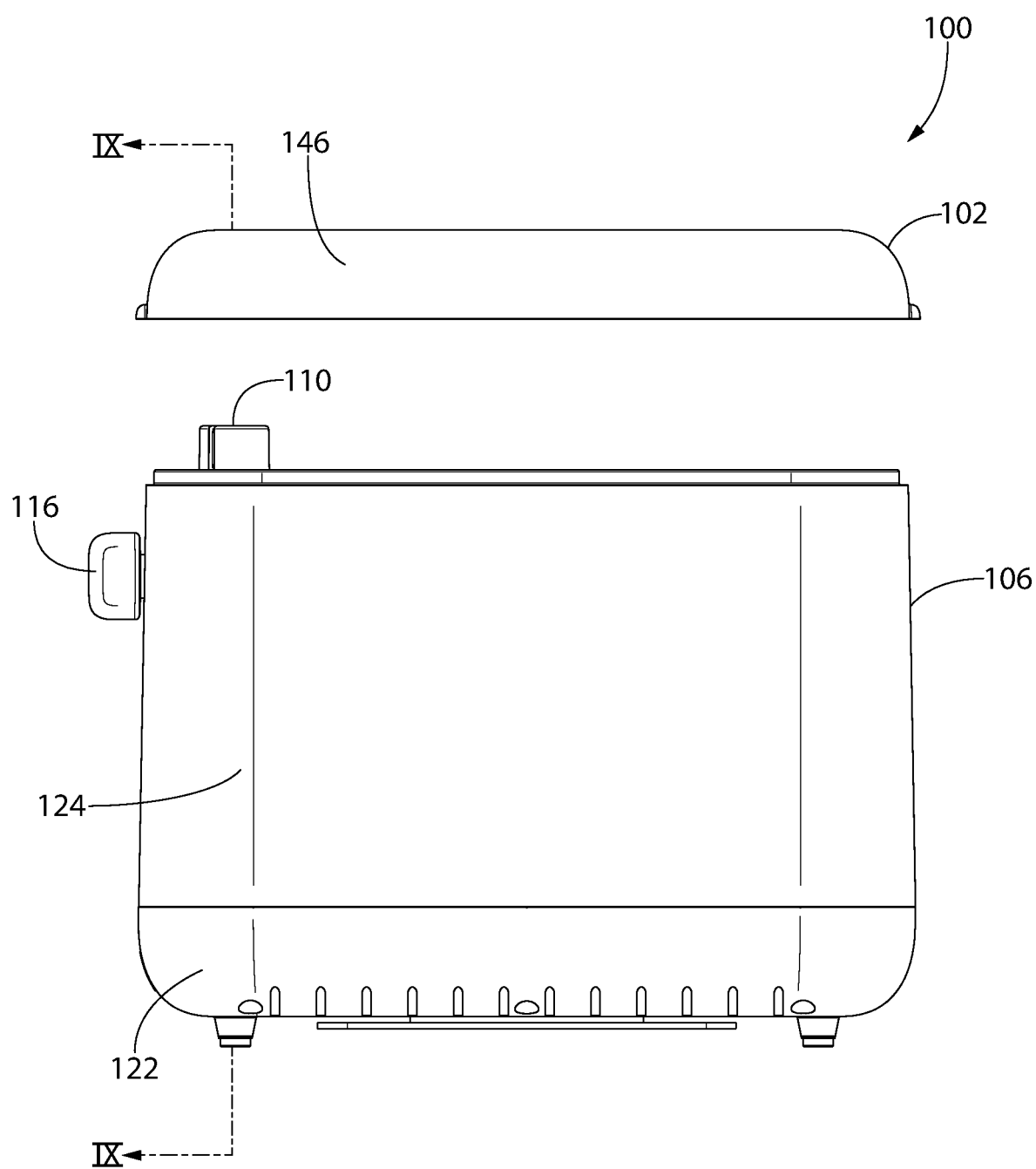
FIG. 5 is a side view of an example device for heating and dispensing a foodstuff in which the cover is separated from the body, as described herein.

All drawings are schematic and not necessarily to scale.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

FIGS. 1-5 show different views of an example toaster 100. Toaster 100 may include a toaster body 106 of a generally rectangular parallelepiped configuration with a top outer surface 120, a bottom outer surface 122, and a side outer surface 124 extending between the top outer surface 120 and the bottom outer surface 122. In other examples toaster body 106 may be shaped in other configurations, such as an oval, circle, square, or one or more other configurations. Toaster 100 may include one or more actuators, such as mode selectors, indicators, temperature sensors, displays, etc. For example, toaster 100 may include toaster button 112a, bagel button 112b, etc. for selecting one or more modes of toasting a foodstuff, selecting cooking temperatures, selecting durations of cooking foodstuffs, etc.

Toaster 100 may include one or more openings for inserting a foodstuff. For example, one or more slots, such as bread slots 114a, 114b (collectively bread slots 114) may be formed on the top outer surface 120 of toaster body 106. In other examples one or more bread slots 114 may be formed on other surfaces of toaster body 106, such as on side surface 124 of toaster body 106. One or more heating chambers 834a, 834b (collectively heating chambers 834) (FIG. 9) may be formed below each of the bread slots 114. Bread slots 114 and/or heating chambers 834 may be formed in a configuration, such as in a rectangular configuration, so that a foodstuff (e.g., sliced bread/bagel) may be received into the bread slots 114 and/or heating chambers 834 for toasting.

Toaster body 106 may include heating elements, such as heating elements 830a, 830b (collectively heating elements 830). Examples of heating elements 830 may include heating coils, heating cards, and the like. Heating elements 830 may be secured within toaster body 106 on opposite sides of each toasting chamber 834. For example, heating elements 830 may be secured within toaster body 106 by wire ties, welding, clips, bands, etc. Heating elements 830 may be wound around a component, for example, from a bottom of toasting chamber 834 to a top of toasting chamber 834. A covering, such as a wire mesh or other shield, may be provided in shielding relation to heating elements 830 to prevent the foodstuff (e.g., bread) from directly contacting heating elements 830.

Figure 8:
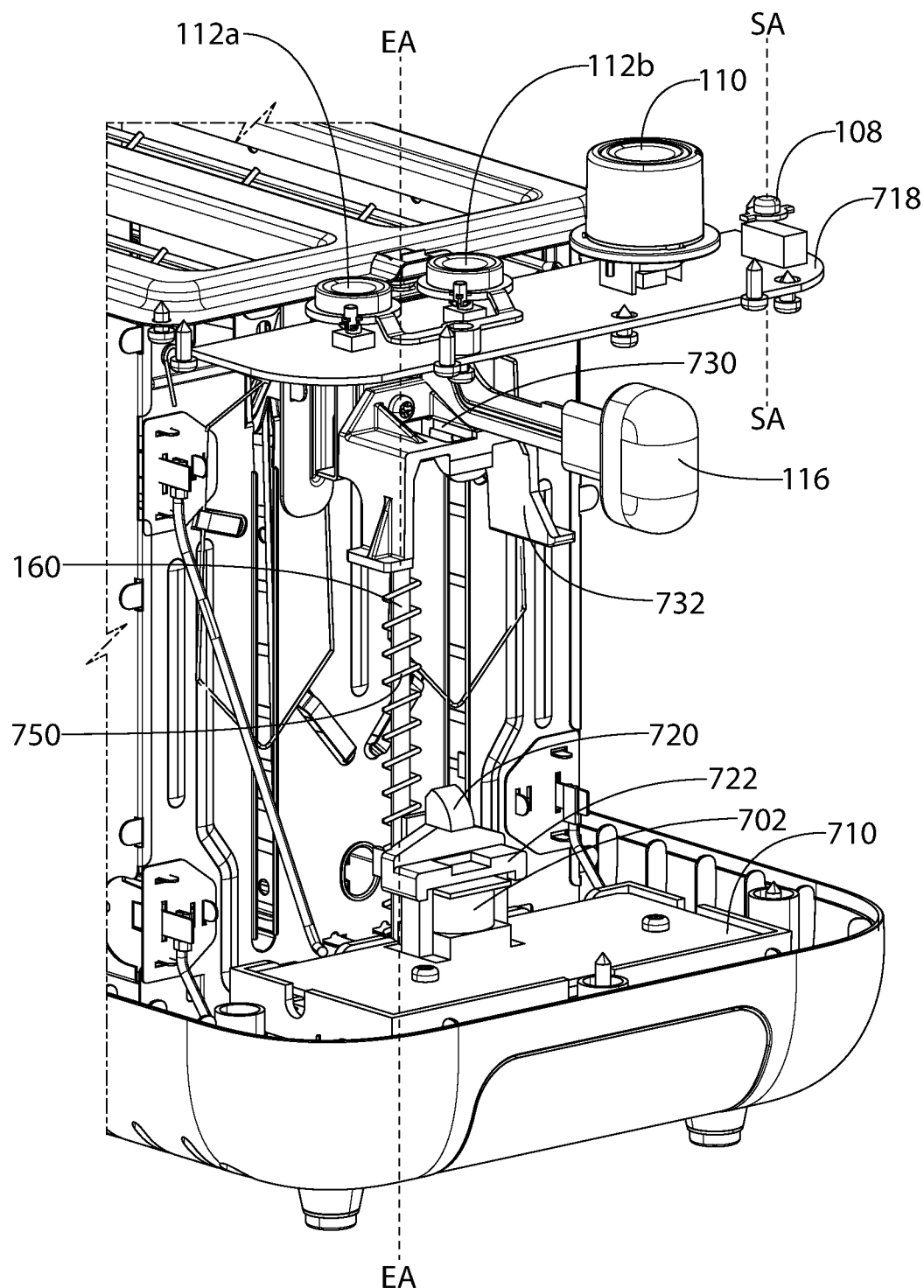
FIG. 8 is an exploded internal view of an example device for heating and dispensing a foodstuff, as described herein.
Figure 15:
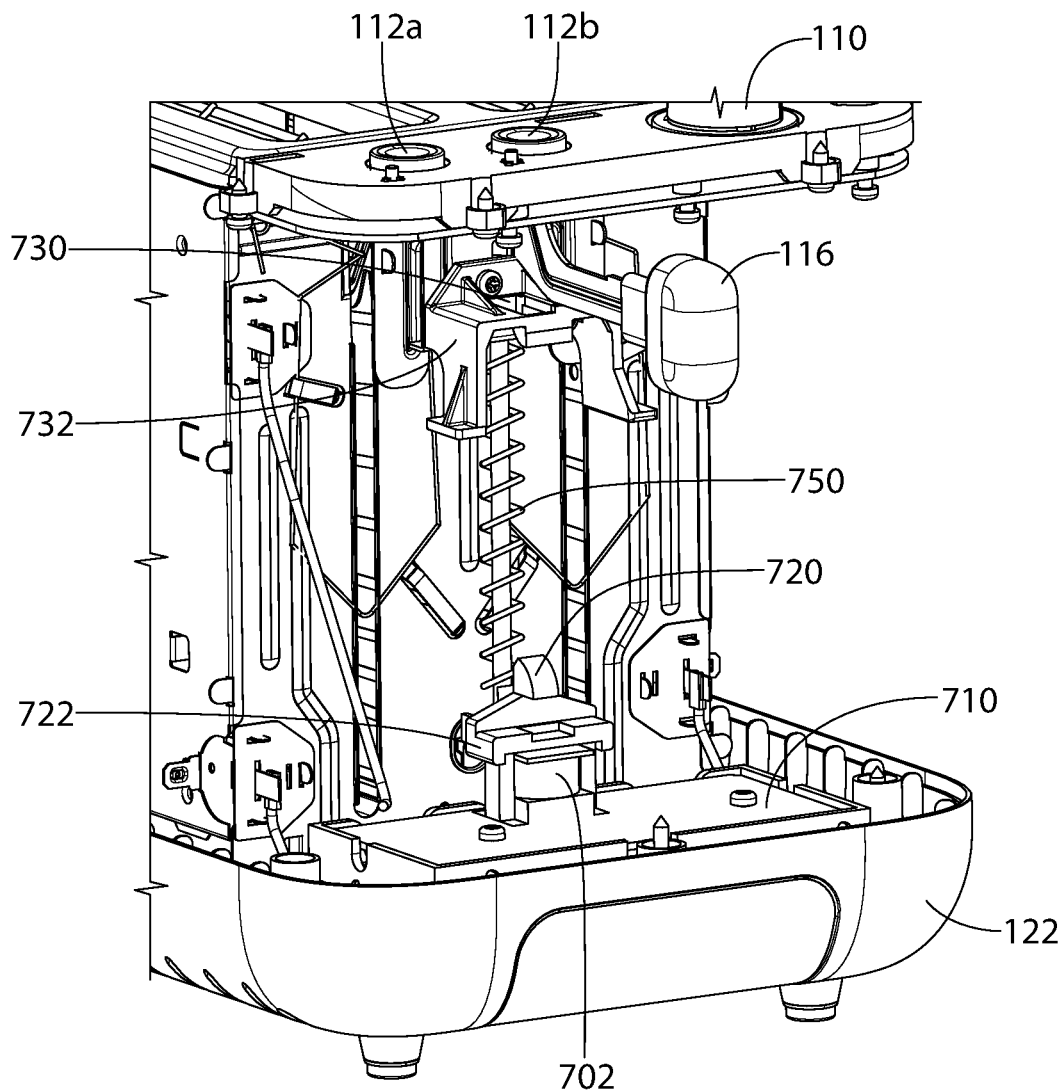
FIG. 15 is an internal view of an example device for heating and dispensing a foodstuff in which the lever is not depressed, as described herein.
Figure 16:
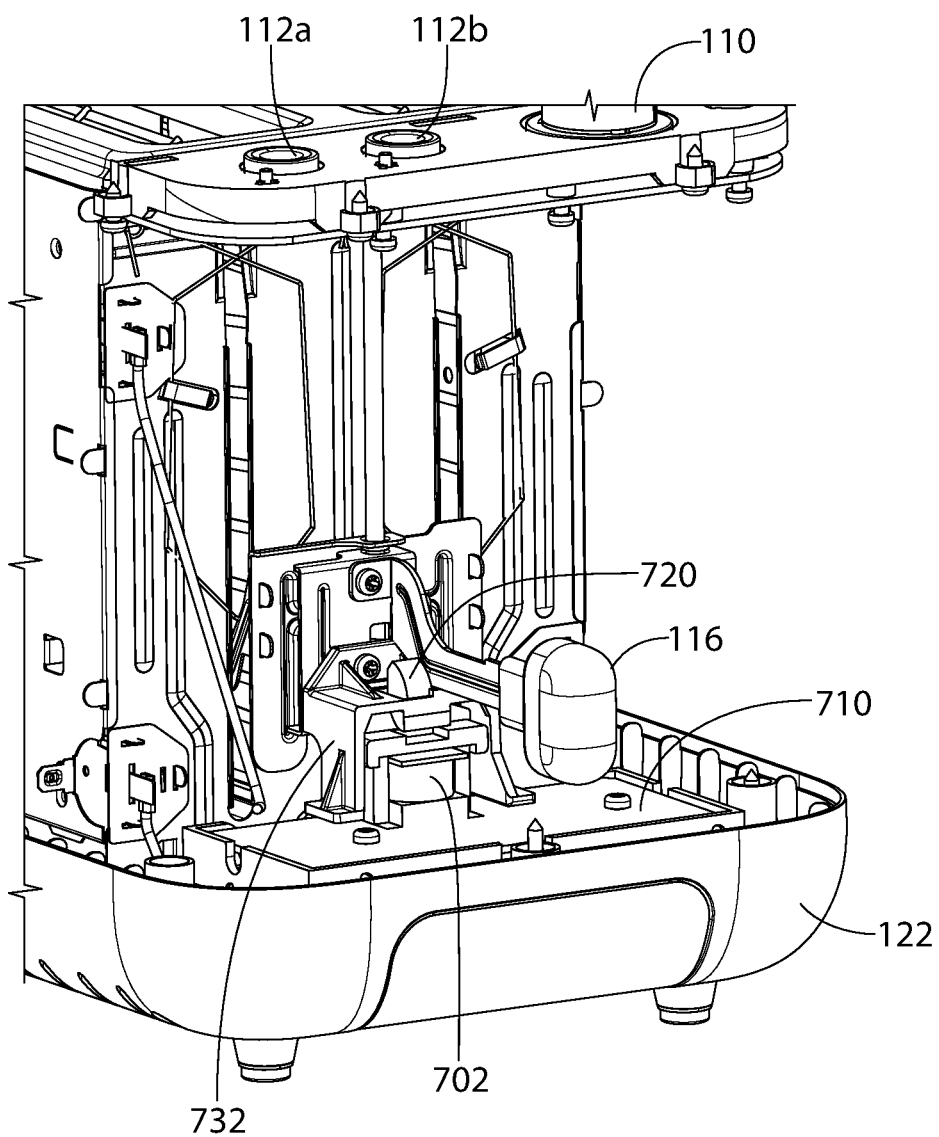
FIG. 16 is an internal view of an example device for heating and dispensing a foodstuff in which the lever is depressed, as described herein.

One or more elevators 832a, 832b (collectively elevators 832) may be positioned in or about one or more (e.g., each) heating chambers 834. Elevators 832 may be part of an elevator assembly, such as elevator assembly 732 (FIG. 8). As shown on FIGS. 9 and 10, elevators 832 may be positioned between respective heating elements 830. Elevators 832 may be adapted to move vertically between the upper heating position (FIG. 15) and the lower heating position (FIG. 16). In examples, elevators 832 may include a lower, horizontally oriented, supporting bar on which a food item (such as bread) is supported. Elevators 832 may be positioned on guide pole 160 that may allow elevators 832 to move in vertical directions (e.g., in an upward direction and a downward direction).

Elevators 832 may be coupled to a lever, such as lever 116, which may be configured to manipulate (e.g., move) elevators 832 in vertical directions. Lever 116 may be slidably mounted on guide pole 160 and may extend out from toaster body 106, for example, through a vertically oriented and elongated slot 117 in toaster body 106. Lever 116 may include one or more components, such as a knob formed at the free end of lever 116, that may extend out of elongated slot 117 for engagement by a user, in order to move lever 116 between the positions shown in FIGS. 15 and 16. Lever 116 may be coupled to one or more devices, such as one or more biasing elements 750 (e.g., springs) that may be used to assist elevators 832 in moving along guide pole 160. Biasing element 750 may provide resistance to elevators 832 in moving elevators and/or lever 116 in a downward motion along guide pole 160. Biasing element 750 may provide assistance to elevators 832 in moving elevators and/or lever 116 in an upward motion along guide pole 160, for example, when lever is no longer secured at a bottom-most position, as described herein.

Lever 116 may be part of a levering apparatus. As shown on FIGS. 15 and 16, levering apparatus may include lever 116, elevator assembly 732, and/or an aperture 730 adjacent to elevator assembly 732. Elevator assembly 732 and/or an aperture 730 may be configured to engage with a retaining portion, such as retaining portion 720, when lever 116 is depressed and/or elevators 832 are moved down along guide pole 160. Retaining portion 720 may be a flange or other mechanism that may be configured to engage with elevator assembly 732 and/or an aperture 730 of lever apparatus. For example, retaining portion 720 may be configured to engage with aperture 730 and hold lever 116 in the depressed position. Retaining portion 720 may be flexible and/or movable. Retaining portion 720 may be curved, tapered, or otherwise shaped to engage with one or more portions of levering apparatus, such as aperture 730. Retaining portion 720 may be adjacent to, formed from, and/or extend from a retaining housing 722. In other examples, retaining housing 722 may include another portion (e.g., second retaining portion) for retaining lever 116 in a bottom-most position. For example, a surface of retaining housing 722, such as a side surface, may be used as a second retaining portion for retaining lever 116 in a bottom-most position.

Figure 17:
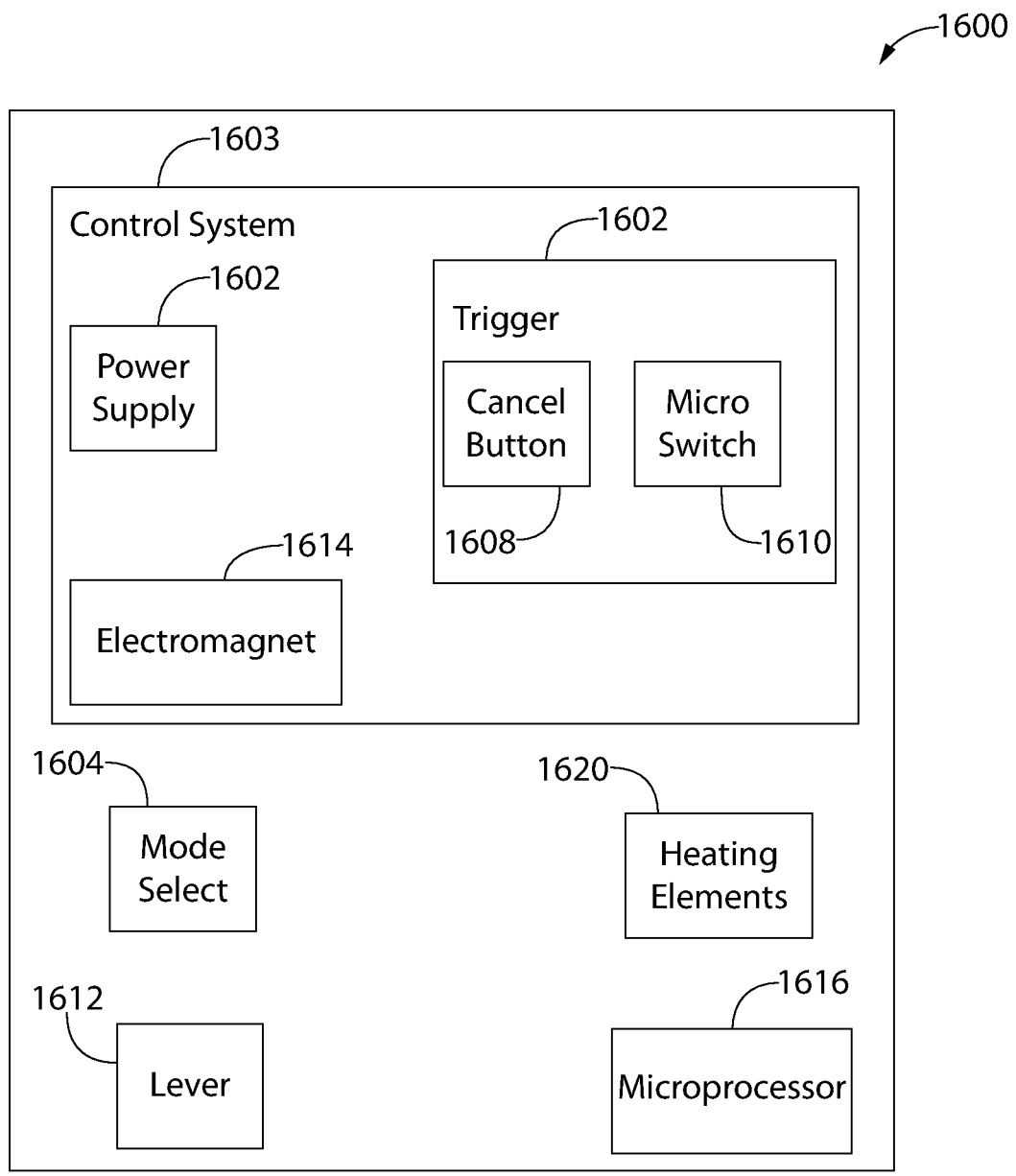
FIG. 17 is a block diagram of an example device for heating and dispensing a foodstuff, as described herein.

Toaster 100 may include a control system (such as control system 1603, shown on FIG. 17). One or more components of control system may be configured to cause power to be cut to one or more components of toaster 100 (e.g., when toaster 100 is in a cut-power state) and/or to cause power to be provided to one or more components of toaster 100 (e.g., when toaster 100 is in a normal state in which power may be provided). For example, control system (e.g., switch 108) may be configured to cause power to be cut and/or provided to heating elements 830.

Control system may include one or more components, such as a power supply (e.g., power supply 1602), one or more triggers, and/or an electromagnet. Triggers may include cancel button 110 or switch 108. Switch 108 may be a micro-switch 108 that may be alterable between a normal (e.g., provide power state) and cut-power state, as described herein. Electromagnet may be electromagnet 702. Electromagnet 702 may be configured to receive power from one or more power sources, such as power supply 1602 (FIG. 17). Electromagnet 702 may provide a magnetic force when powered and may not provide a magnetic force when not powered. Electromagnet 702 may be a solenoid (e.g., an electromagnet solenoid). For example, electromagnet 702 may be a cylindrical coil of wire (e.g., single wire). When an electric current flows through the wire the solenoid may generate a magnetic field. In other examples electromagnet 702 may be a solenoid wound around a central core (e.g., central iron core).

Retaining housing 722 and/or retaining portion 720 may be formed of ferromagnetic element. For example, retaining housing 722 and/or retaining portion 720 may be formed of a metallic, substantially metallic, or other material that may be attracted to a magnet (such as electromagnet 702). When electromagnet 702 is powered, electromagnet 702 may be configured to exert a magnetic field that may act upon the ferromagnetic element. Magnetic field acting upon the ferromagnetic element may cause retaining housing 722 and/or retaining portion 720 to move. For example, when electromagnet 702 is powered electromagnet 702 may cause retaining portion 720 to be pulled in a downward and/or a sideward direction, which may be towards electromagnet 702. When lever 116 is depressed and at a bottom most position (FIG. 16), and electromagnet 702 is powered, retaining portion 720 and/or retaining housing 722 may be moved such that retaining portion 720 and/or retaining housing 722 may engage aperture 730 and hold lever 116 in the downward-most position. Holding lever 116 in the downward-most position may cause lever 116 to be held in a locked state. Power may be provided (e.g., from power supply, such as power supply 1602), for example, to heating elements 830, when lever 116 and/or retaining portion 720 are in the locked state, as described herein. When lever 116 and/or retaining portion 720 are in the locked state, the toaster 100 may be in a normal operation state. In a normal operation state control system may provide power to electromagnetic 702 from the power supply.

Positioning lever 116 in the downward-most position may cause a signal to be sent to a microprocessor, such as microprocessor 1616 (FIG. 17). Microprocessor may be located on a PCB, such as control PCB 710 and/or power PCB 718. Control PCB 710 may be below (e.g., directly below) micro-switch 108 and/or micro-switch 108 may be built into control PCB 710. Control PCB 710 may be below one or more other actuators (e.g., cancel button 110) and/or cancel button 110 may be built into control PCB 710. In such examples, actuation of micro-switch 108 and/or cancel button 110 may provide signals to control PCB 710 directly. After receiving the signal, microprocessor 1616 of control PCB 710 may indicate that power be provided to heating elements 830 for heating elements 830 to begin heating. For example, microprocessor 1616 of control PCB 710 may indicate to power PCB 718 (e.g., a microprocessor positioned on power PCB 718) that power be provided to heating elements 830 for heating elements 830 to begin heating. Control PCB 710 and power PCB 718 may communicate via one or more methods, such as via a wire.

Elevator assembly 732 may be configured to electrically couple heating elements 830 to a power supply when lever 116 (e.g., elevator 832) is in a lowered position. For example, lever 116 may be configured to cause elevator assembly 732 to close electrical contacts connected to a circuit board (e.g., such as control PCB 710) when lever 116 is in a downward-most position. Closing the electrical contacts may cause the signal to be sent from control PCB 710 (e.g., microprocessor of control PCB 710) to power PCB 718 (e.g., microprocessor of power PCB 718). After receiving the signal, microprocessor of power PCB 718 may control the supply of power to heating elements 830, thereby starting the heating operation. Lever 116 may be retained by electromagnet 702 in the downward-most position for a predetermined time period or until an event (e.g., trigger) occurs, as described herein.

The predetermined time for retaining lever 116 may be determined by microprocessor 1616 and/or by one or more other devices, such as a mechanical timer. A trigger for releasing lever 116 may include actuating a button (e.g., cancel button 110), actuating a micro-switch 108, and the like. Upon the expiration of the predetermined time and/or upon activation of one or more of the triggers, power may be removed from electromagnet 702. For example, microprocessor of control PCB 710 may indicate to microprocessor of power PCB 718 to remove power from electromagnet 702. Removing power from electromagnet 702 may cause retaining portion 720 and/or retaining housing 722 to move to their resting positions.

When retaining portion 720 and/or retaining housing 722 are in resting positions retaining portion 720 and/or retaining housing 722 may no longer retain lever 116 in a downward-most position. For example, when retaining portion 720 is in its resting position retaining portion 720 may no longer engage with aperture 730, thereby releasing lever 116 from aperture 730. When retaining portion 720 no longer engages with aperture 730, biasing elements 750 may assist (e.g., force) lever 116 and/or elevator 832 in an upward direction along guide pole 160. Lever 116 moving in an upward direction may cause elevator assembly 732 to cause heating elements 830 to decouple from power supply. For example, lever 116 (e.g., elevator 832) moving in an upward direction may cause elevator assembly 732 to cause electrical contacts connected to a circuit board to open. Opening the electrical contacts may cause a signal to be sent from control PCB 710 (e.g., microprocessor of control PCB 710) to power PCB 718 (e.g., microprocessor of power PCB 718). After receiving the signal, microprocessor of power PCB 718 may control the supply of power to heating elements 830, thereby ceasing the heating operation.

Figure 6:
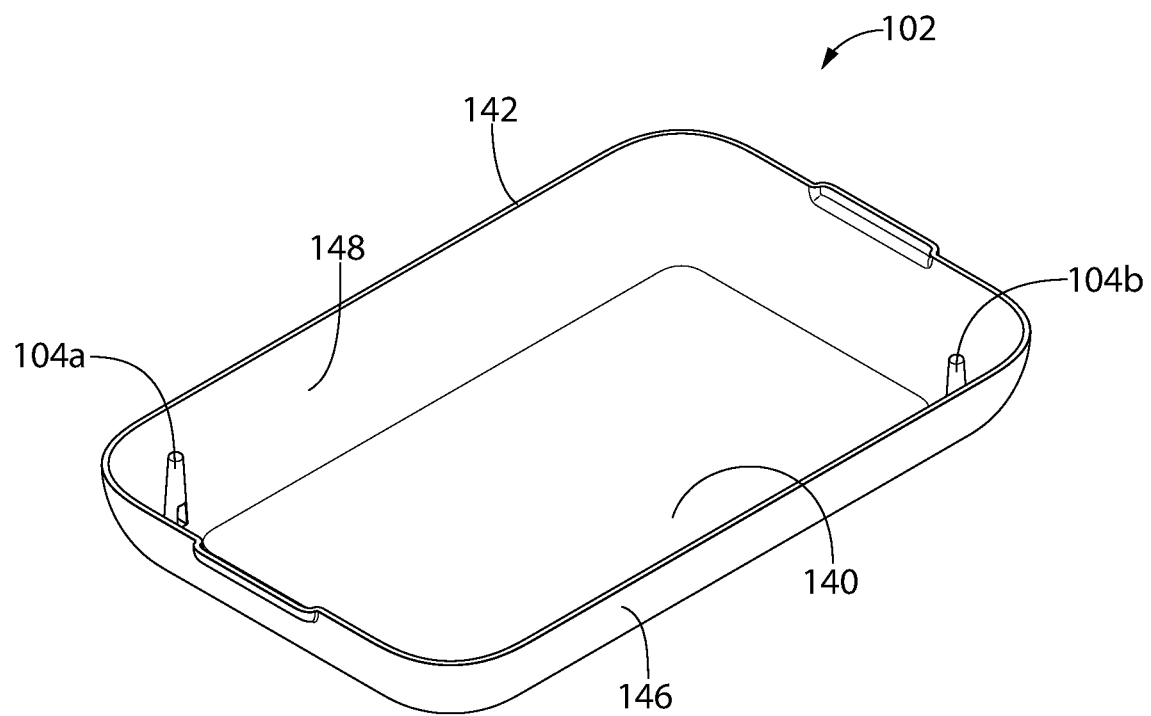
FIG. 6 is a bottom perspective view of an example cover, as described herein.
Figure 7:
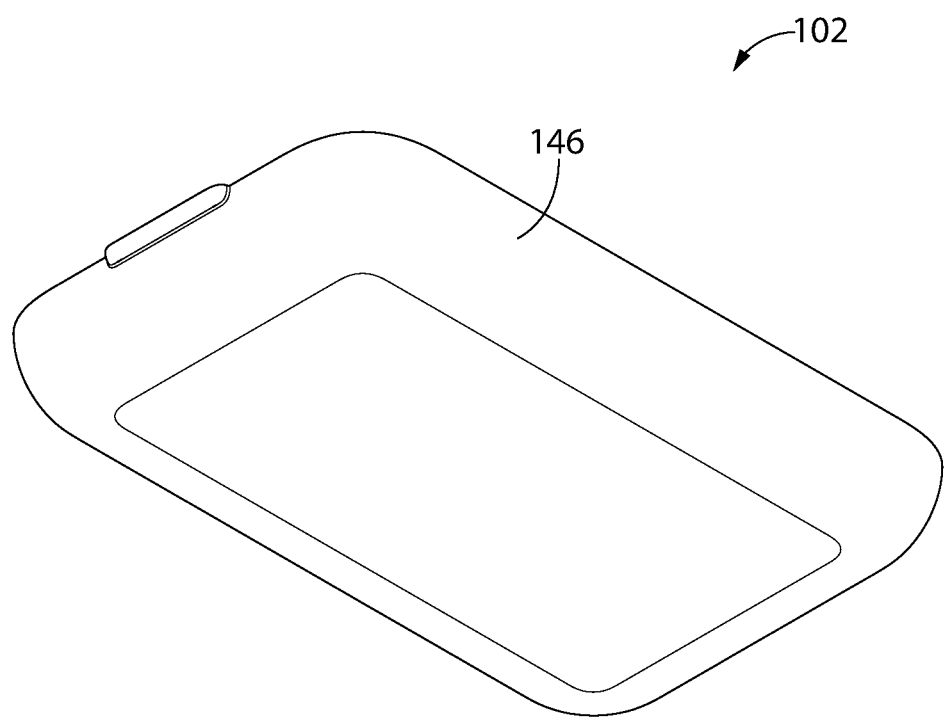
FIG. 7 is a top perspective view of an example cover, as described herein.

FIGS. 6-7 show different views of an example cover 102. Cover 102 may be placed upon toaster body 106 (e.g., placed in an assembled state) or separated from toaster body 106. For example, cover 102 may be separated from toaster body 106 and used as a tray, such as a serving tray. Cover 102 may be comprised of one or more materials, such as plastic, metal, composite materials, etc. Cover 102 may rest upon toaster body 106 and/or cover 102 may engage with toaster body 106. Cover 102 may include a wall (e.g., basin wall 142) that includes inner wall 148 surface and outer wall surface 146. Cover 102 may include a basin floor 140. Basin wall 148 may extend from basin floor 140 to form a tray body. Basin wall 142 may form a continuous wall that circumscribes the basin floor 140. When cover 102 rests upon toaster body 106 (e.g., when toaster 100 and cover 102 are in the assembled state), outer wall surface 146 of basin wall 142 may be flush (e.g., substantially flush) with side outer surface 124 of the lower portion of the toaster body 106. For example, when cover 102 rests upon toaster body 106, the distal edge of basin wall 142 may contact shoulder 126 of toaster body 106 and/or the upper portion of housing of toaster body 106. The distal edge of basin wall 142 may contact less than the entirety of shoulder 126 or the entirety of shoulder 126.

Cover 102 may include one or more actuation elements, such as first protuberance 104a and/or second protuberance 104b (collectively protuberance 104). Protuberance 104 may extend from cover 102. For example, protuberance 104 of the toaster cover 102 may extend from basin floor 140 of cover 102. In examples protuberance 104 may be comprised of the same material as cover 102 (e.g., a plastic) or may be comprised of a material different than the material of cover 102. An example includes protuberance 104 being formed of a conductive material and cover 102 being formed of a non-conductive material.

Figure 9:
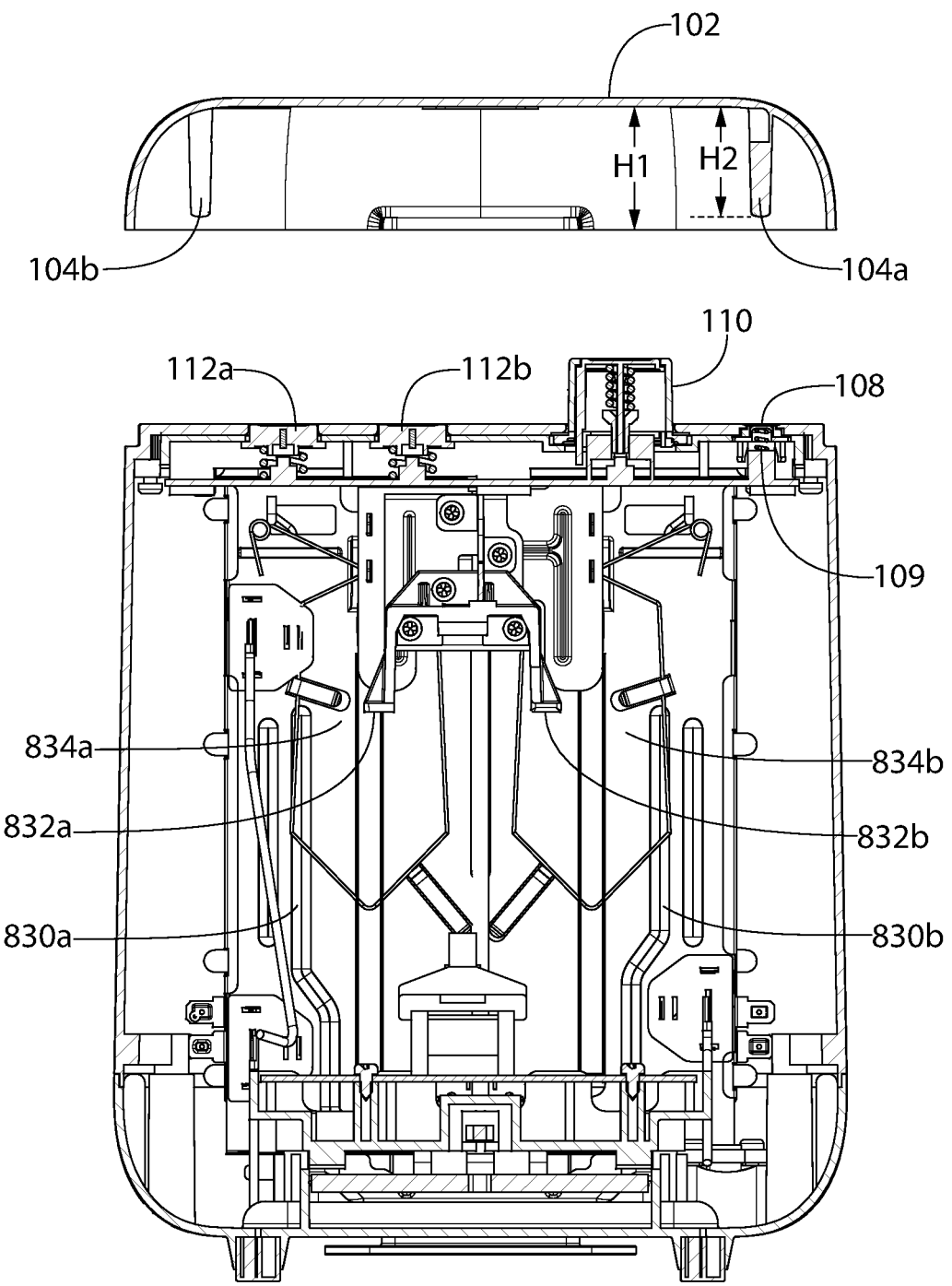
FIG. 9 is a cross-sectional view of an example device for heating and dispensing a foodstuff as shown on FIG. 5, as described herein.
Figure 10:
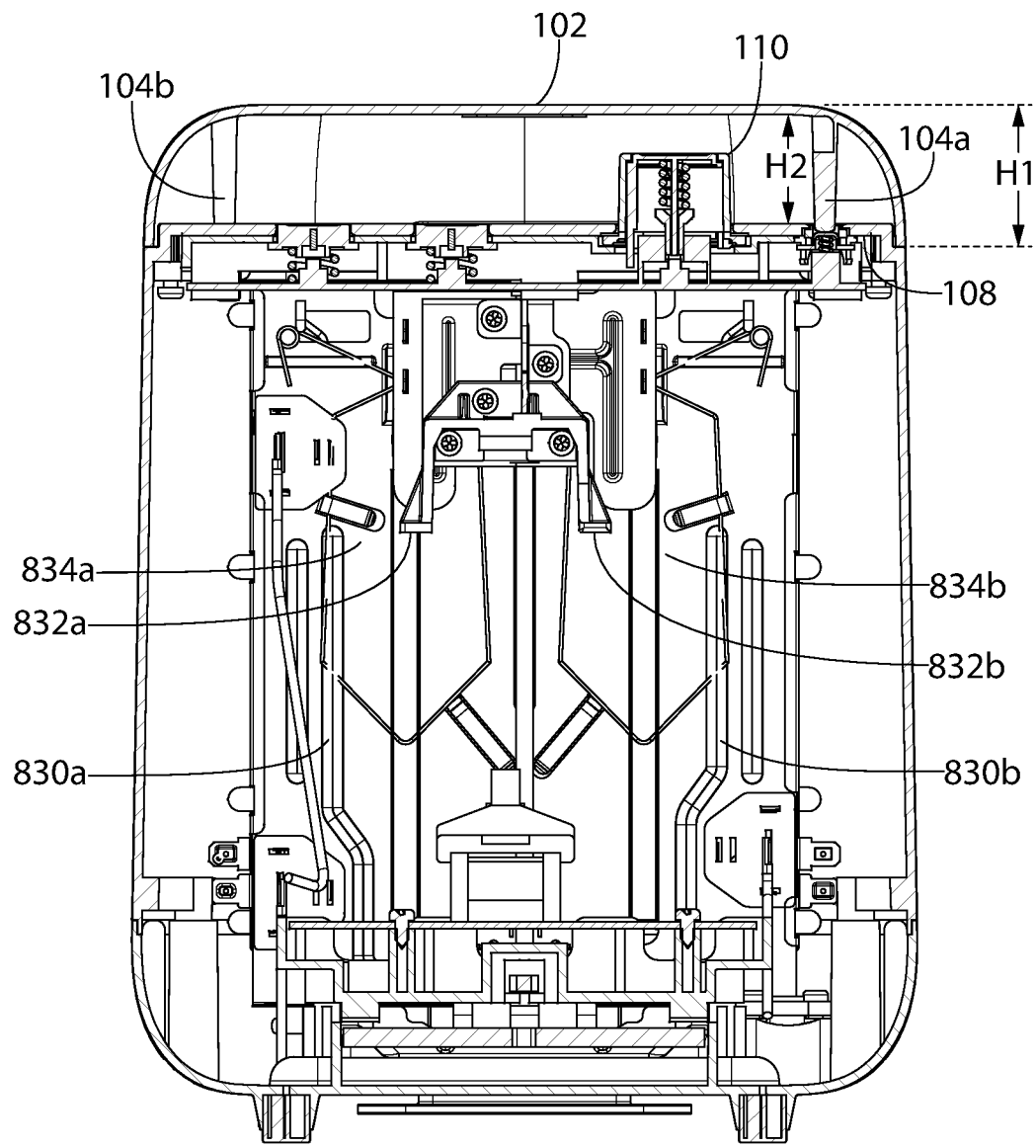
FIG. 10 is a cross-sectional view of an example device for heating and dispensing a foodstuff as shown on FIG. 4, as described herein.

As shown on FIGS. 9 and 10, basin wall 142 may extend a first height H1 from basin floor 140. Protuberance 104 may extend a second height (H2) from basin floor 140. First height H1 (of basin wall 142) may be greater than the second height H2 (of protuberance 104), although in examples first height H1 and second height H2 may be the same height, or first height H1 may be less than the second height H2. Basin wall 142 may rest on one or more portions of toaster body 106, such as shoulder 126. Shoulder 126 may be positioned on an outer surface (e.g., side outer surface) that circumscribes toaster body 106. Shoulder 126 may separate the toaster body 106 into an upper portion (e.g., top outer surface 120) located above shoulder 126 and a lower portion (e.g., side outer surface 124).

Protuberance 104 may be configured to engage with one or more portions of toaster body 106. One or more portions of toaster body 106 (such as top outer surface 120 of toaster body 106) may include a switch, such as micro-switch 108. Micro-switch 108 may be located within an aperture of top outer surface 120. Micro-switch 108 may be configured to stop power to one or more components of toaster 100, as described herein. For example, micro-switch 108 may be configured to stop power to electromagnet 702 and/or heating elements 830 of toaster 100. In other examples micro-switch 108 may be configured to reduce power to electromagnet 702 such that electromagnet 702 has an insufficient magnetic field to hold lever 116 (e.g., lever apparatus) in a downward-most position.

Top outer surface 120 may define an axis, such as top portion axis TP (FIG. 1). For example, micro-switch 108 may include a switch actuator located below, aligned with, and/or aligned above the aperture along top portion axis TP. Micro-switch 108 (e.g., switch actuator of micro-switch 108) may be alterable between two or more positions, such as between a raised position and a lowered position. The raised position may be the power-power state and the lowered position may be the cut-power state. Micro-switch 108 may be alterable between a raised position and a lowered position by moving micro-switch 108 relative (e.g., along, perpendicular to, etc.) switch axis SA (FIG. 8). Switch axis SA may be parallel (e.g., substantially parallel) to elevator axis EA. Elevator axis EA may define the vertical disposition of guide pole 160 (e.g., may be parallel to guide pole 160).

Micro-switch 108 may be alterable from a raised position to a lowered position via protuberance 104. The raised position may be above top portion axis TP and the lowered portion may be below top portion axis TP. Protuberance 104 may move in a direction along switch axis SA as the toaster cover 102 is moved from a state in which the cover 102 is detached from the toaster body 106 to a state in which the cover 102 is attached to the toaster body 106. For example, micro-switch 108 may be alterable from a raised position to a lowered position via protuberance 104 pressing (e.g., pressing down) on micro-switch 108 as the cover 102 is attached to toaster body 106. The lowered position of micro-switch 108 may correspond to a state in which power is cut (e.g., removed) from one or more components of toaster 100, such as power being cut from electromagnet 702 and/or heating elements 830.

Micro-switch 108 may move from a lowered position to a raised position via one or more resilient elements 109 (FIG. 9). Resilient element 109 may be a spring, spacer, switch, plunger, and the like. The protuberance 104 may be configured to overcome the biasing force of the resilient element 109 in one or more fashions. For example, protuberance 104 may include a flange or other element that engages with one or more portions of micro-switch 108, thereby overcoming the biasing force of the resilient element 109. For example, protuberance 104 may include one or more teeth that may engage with one corresponding spaced sections of micro-switch 108 to overcome the biasing force of the resilient element 109.

Features of cover 102 may assist protuberance 104 and/or permit protuberance 104 to overcome the biasing force of the resilient element 109 of micro-switch 108. For example, the weight of the cover 102 may be sufficient to assist/allow protuberance 104 to overcome the biasing force of the resilient element 109. That is, when cover 102 rests on top outer surface 120 of toaster 102, the weight of cover 102 may be such that the weight of the cover 102 pushes protuberance 104 through and/or into switch 108, thereby overcoming the biasing force of the resilient element 109. In other examples, cover 102 may include one or more components that engage with toaster body to assist/allow protuberance 104 to overcome the biasing force of the resilient element 109, such as pins, clips, bands, and the like.

As shown on FIGS. 6 and 7, cover 102 may include a profile. For example, cover 102 may include a transverse cross-sectional profile having a major axis and a minor axis. The minor axis may be shorter than the major axis. Cover 102 may be configured so that the cover 102 may be positioned onto toaster body (e.g., in the assembled state) in (e.g., only in) a first rotational orientation and/or a second rotational orientation. The second rotational orientation may be different than the first rotational orientation. In examples the second rotational orientation may be 180 degrees from the first rotational orientation.

First protuberance 104a may be located on cover 102 so that when the cover 102 is resting on toaster body 106 (e.g., in the assembled state) in the first rotational orientation, first protuberance 104a actuates micro-switch 108, thereby causing a cut-power state and second protuberance 104b does not actuate micro-switch 108. As described herein, the cut power state may include cutting power to one or more components of toaster 100, such as electromagnet 702 and/or heating elements 830, shown on FIGS. 8-10. Cover 102 may include second protuberance 104b that may be located on cover 102 so that when cover 102 is resting on toaster body 106 (e.g., in the assembled state) in the second rotational orientation, second protuberance 104b may actuate micro-switch 108 into the cut-power state, and first protuberance 104a does not actuate micro-switch 108. As described herein, when first protuberance 104a actuates micro-switch 108, second protuberance 104a may not actuate micro-switch 108, and vice-versa. In other examples toaster 100 may include more than one micro-switch 108 and more than one protuberance 104. In such examples one or more of the protuberances 104 may actuate one or more of micro-switches 108.

Figure 11:
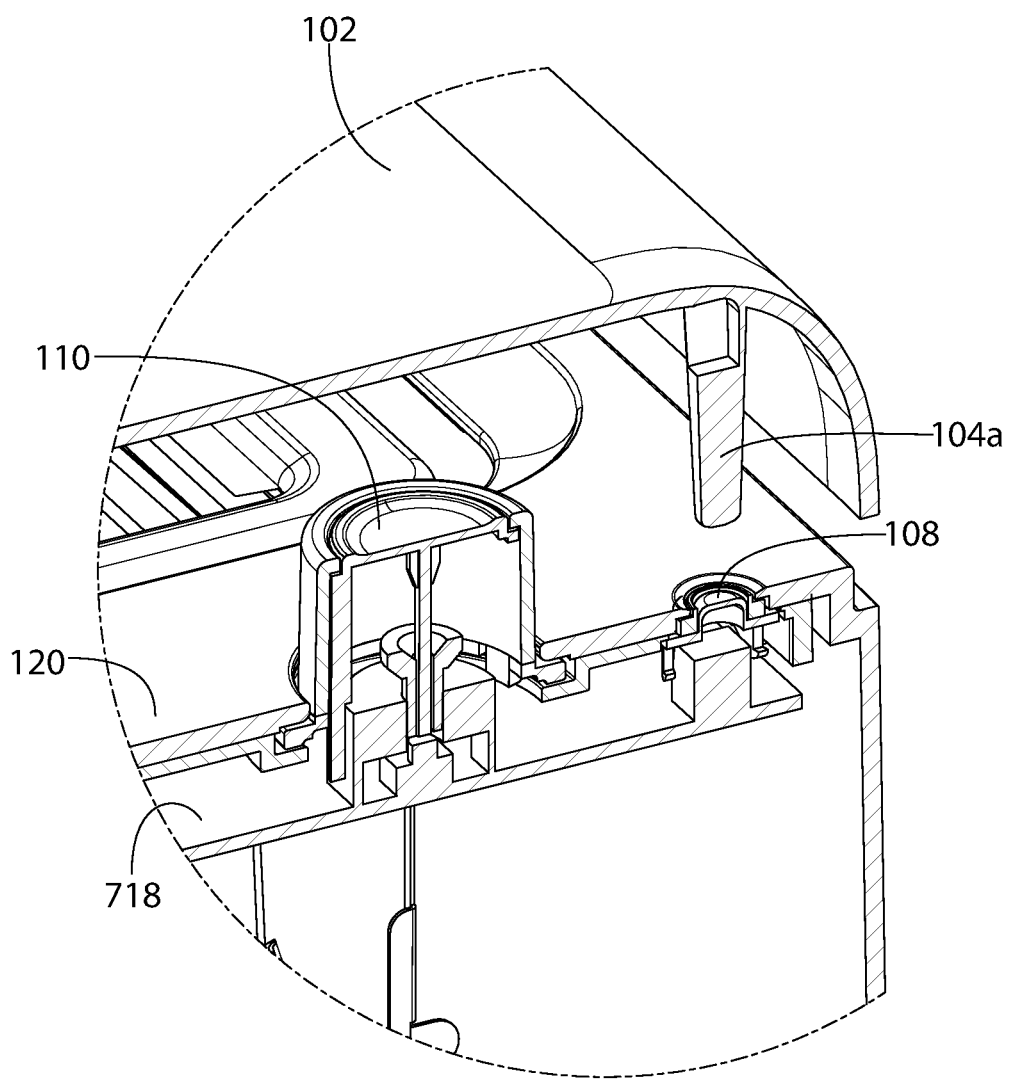
FIG. 11 is an exploded perspective view of FIG. 9, as described herein.
Figure 12:
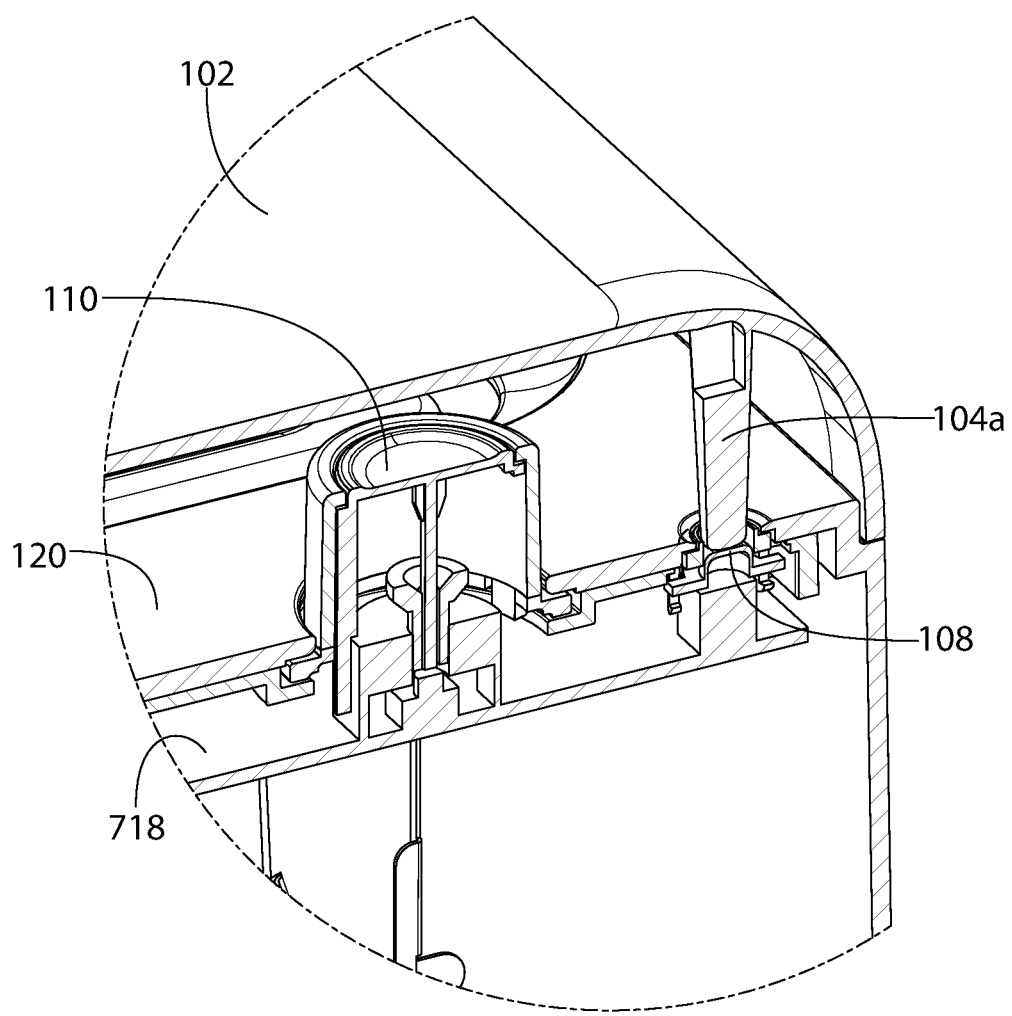
FIG. 12 is an exploded perspective view of FIG. 10, as described herein.

Electromagnet 702 may be deactivated in one or more ways which may result in lever 116 being released and/or heating elements 832a, 832b no longer being activated. Electromagnet 702 may be deactivated via activation/actuation of micro-switch 108. As described herein, and shown on FIGS. 11-12, micro-switch 108 may be activated via protuberance 104. For example, upon toaster cover 102 being placed upon toaster body 106, protuberance 104 may engage with micro-switch 108. Protuberance 104 actuating micro-switch 108 may result in micro-switch 108 sending a signal to control PCB 710 (e.g., microprocessor of control PCB 710) to deactivate electromagnet 704. In examples control PCB 710 (e.g., microprocessor of control PCB 710) may send a signal to power PCB 718 (e.g., microprocessor of power PCB 718) to deactivate electromagnet 704. As a result of electromagnet 704 being deactivated (e.g., losing power), electromagnet 704 may release retaining portion 720 from aperture 730.

Figure 13:
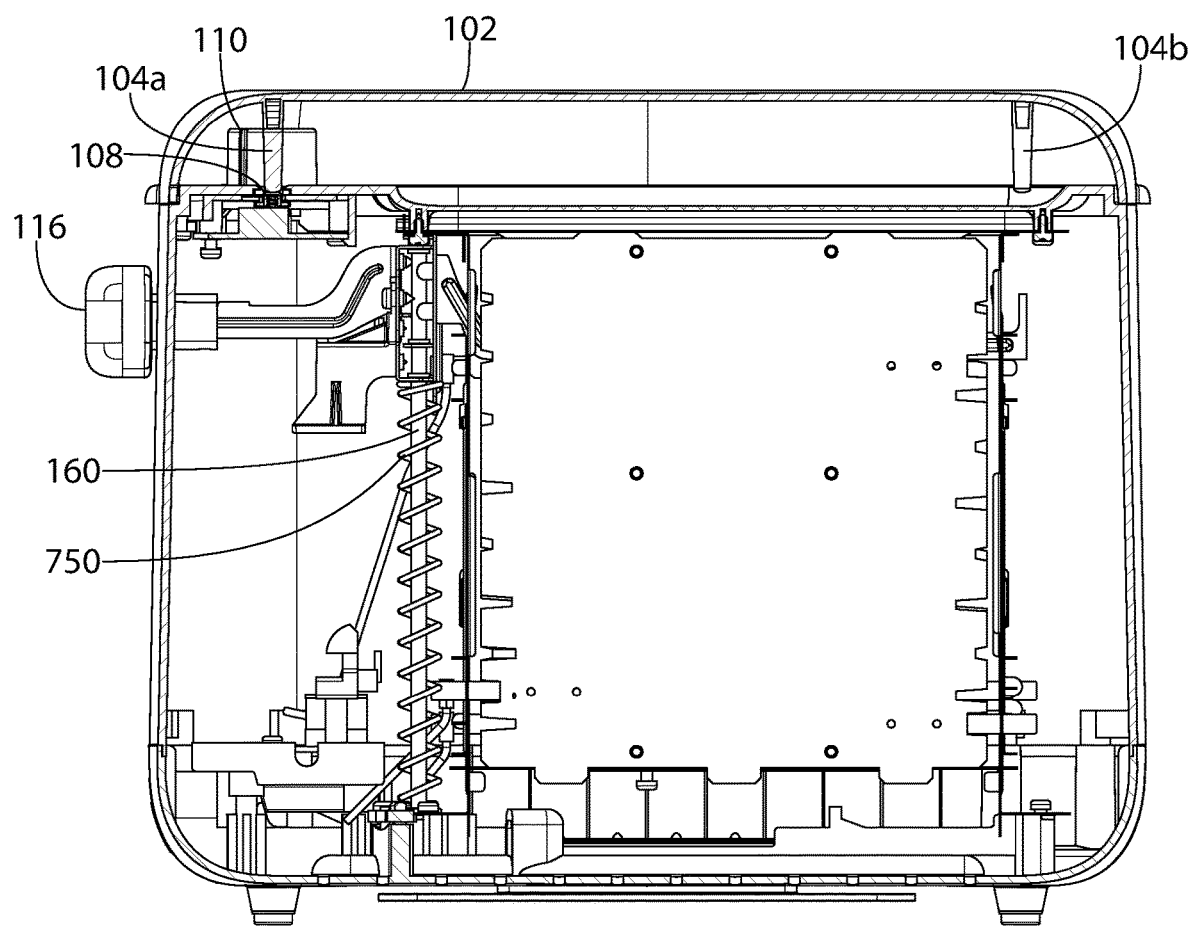
FIG. 13 is a cross-sectional view of an example device for heating and dispensing a foodstuff as shown on FIG. 2, as described herein.
Figure 14:
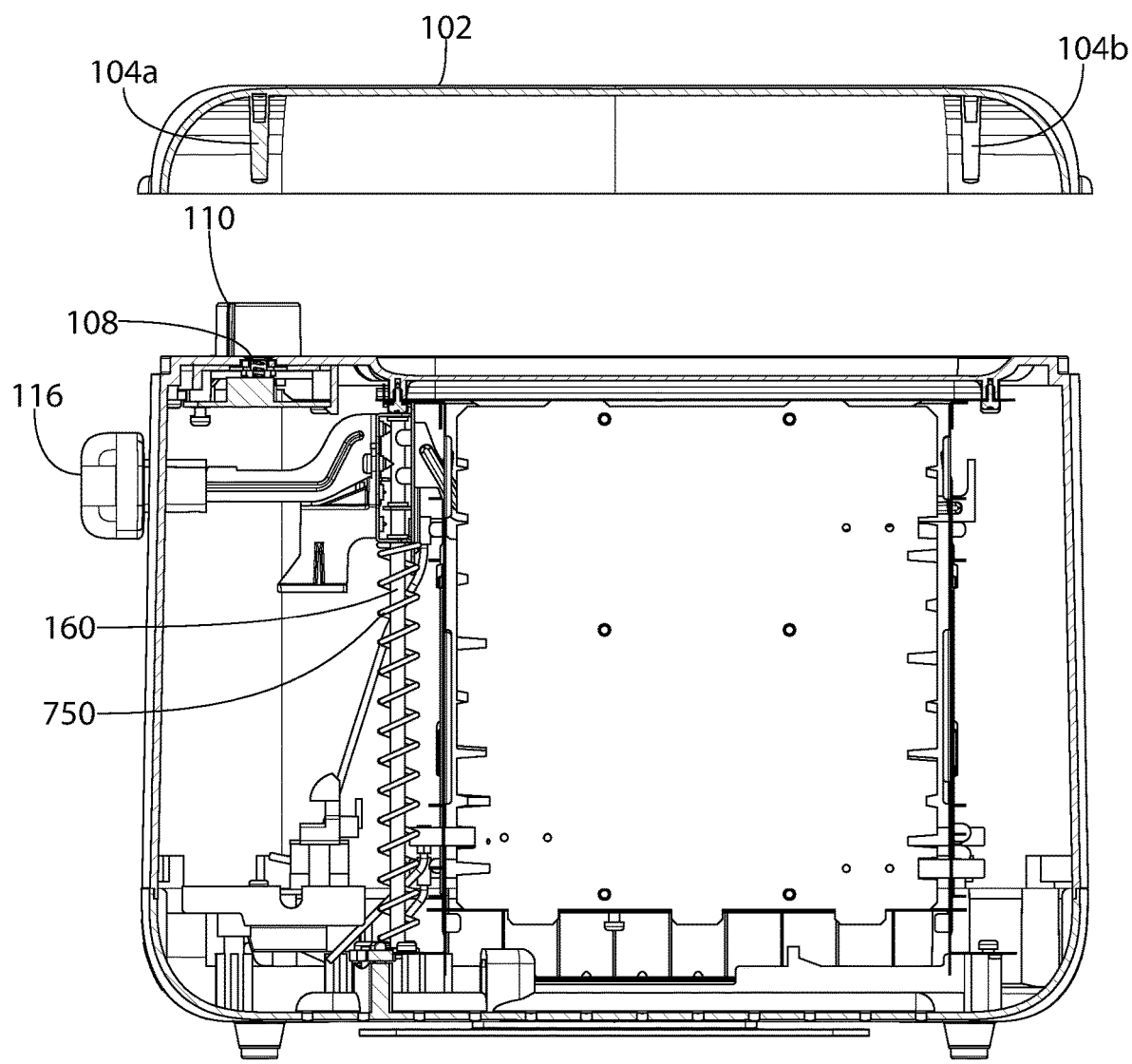
FIG. 14 is a cross-sectional view of an example device for heating and dispensing a foodstuff as shown on FIG. 3, as described herein.

When retaining portion 720 is released from aperture 730, lever 116 may be free to move in a vertical direction. When lever 116 is free to move in a vertical (e.g., upward) direction, lever 116 and/or retaining portion 729 may be in an unlocked state. When lever 116 and/or retaining portion 720 are in the unlocked state, control system may reduce power to electromagnetic 702 from the power supply. As such, lever 116, which is no longer restrained by electromagnet 704, may be biased up along guide pole 160 (e.g., via biasing element 750, shown on FIGS. 13-15) to the position shown in FIG. 15. In this position, elevator assembly 732 may cause heating elements 830 to decouple from power supply (e.g., no longer close the electrical contacts), thereby resulting in heating elements 832a, 832b no longer being activated.

One or more components of control system (e.g., electromagnet 702) may be deactivated via an actuator (e.g., cancel button 110, micro-switch 108), for example, in a cut-power state. As a result of control system (e.g., electromagnet 702) being deactivated, lever 116 may no longer be held by electromagnet 702 and may be free to move along guide pole 160, as described herein. For example, lever 116, which is no longer restrained by electromagnet 702, may be biased up along guide pole 160 (e.g., via biasing elements 750 (e.g., spring or other device)) to the position shown in FIG. 15. In this position, elevator assembly 732 may cause heating elements 830 to decouple from power supply (e.g., no longer close the electrical contacts), thereby resulting in heating elements 832a, 832b no longer being activated.

Toaster 100 may include one or more PCBs, such as power PCB 718 and control PCB 710. PCBs may be aligned perpendicular to switch axis SA and/or parallel to switch axis SA. The PCBs may include one or more components, such as resistors, capacitors, inductors, potentiometers, transformers, diodes, transistors, rectifiers, integrated circuits, oscillators, switches/relays, sensors, as well one or more other components as known by those of skill in the art. The PCBs may include one or more microprocessors, which may incorporate functions of a central processing unit (CPU) on a single integrated circuit. Although examples herein may describe a microprocessor for controlling power provided to and/or removed from components of toaster 100, it should be understood that this is for illustration purposes only. One or more other components, such as an integrated circuit, microprocessor, resistor, capacitor, inductor, etc. may be used for controlling power provided to and/or removed from components of toaster 100.

Power PCB 718 may include one or more electronic components, such as a microprocessor. Microprocessor of power PCB 718 may be microprocessor 1616. Microprocessor of power PCB 718 may determine when power is to be provided to and/or not provided to one or more components of toaster 100, such as electromagnet 702 and/or heating elements 830. In other examples microprocessor of power PCB 718 may receive an indication (e.g., an indication from control PCB 710) when power is to be provided to and/or not provided to one or more components of toaster 100. For example, microprocessor of control PCB 710 may determine that power is to be provided to heating elements 830 when lever 116 is depressed to its downward-most position and/or may determine that power is not to be provided to heating elements 830 when lever 116 is released from its downward-most position. Control PCB 710 may provide an indication to power PCB 718 that power should be provided or should not be provided to heating elements 830. Power may be received from one or more power supplies 1602, such as AC power received by an electrical outlet.

Control PCB 710 may include one or more electronic components, such as a microprocessor. Microprocessor of control PCB 710 may be microprocessor 1616, although microprocessor of control PCB 710 and microprocessor of power PCB 718 may be separate processors. Microprocessor of control PCB 710 may determine when power is to be provided to and/or not provided to one or more components of toaster 100, such as electromagnet 702 and/or heating elements 830. Control PCB 710 may communicate, for example, to power PCB 718, when power is to be provided to and/or not provided to one or more components of toaster 100.

One or more components coupled to lever 116 may close electrical contacts connected to a circuit board (e.g., control PCB 710) while lever 116 is in a downward-most position. For example, when lever 116 is in the lowered position, elevator assembly 732 may cause heating elements 830 to couple with power supply (e.g., close the electrical contacts), thereby resulting in heating elements 832a, 832b being activated. The circuit board may be associated with control PCB 710, such as being associated with microprocessor of control PCB 710. Closing the electrical contacts may provide the signal to the microprocessor of control PCB 710. After receiving the signal, microprocessor of control PCB 710 may control the supply of power to electromagnet 702 and/or heating elements 830, thereby starting the heating operation. For example, after receiving the signal, microprocessor of control PCB 710 may indicate to power PCB 718 (e.g., microprocessor of power PCB 718) to control the supply of power to electromagnet 702 and/or heating elements 830. In other examples, electromagnet 702 may be provided with power prior to lever 116 reaching its downward-most position.

FIG. 16 shows an internal view of toaster 100 in which lever 116 is depressed to its downward-most position. Lever 116 may be retained by electromagnet 702 in the downward-most position for a predetermined time period. For example, when electromagnet 702 is powered electromagnet 702 may move one or more portions of retaining housing 722 and/or retaining portion 720. As lever is moved to a downward-most position (FIG. 16), the one or more portions (e.g., portions moved) of retaining housing 722 and/or retaining portion 720 may engage with aperture 730, which may hold lever 116 in place at lever's downward-most position. Positioning lever 116 in its downward-most position may cause a signal to be sent to a microprocessor, such as microprocessor 1616. Microprocessor may be located on a PCB, as described herein, such as control PCB 710. After receiving the signal, microprocessor 1616 may indicate that power be provided to heating elements 830 so that heating of heating elements 830 may begin. As an example, microprocessor may indicate to power PCB 718 (e.g., a microprocessor positioned on power PCB 718) that power be provided to heating elements 830. For example, while lever 116 is in a downward-most position lever 116 may close electrical contacts connected to a circuit board. Closing electrical contacts may provide the signal to the microprocessor. After receiving the signal, microprocessor 1616 may control the supply of power to heating elements 830, thereby starting the heating operation.

As described herein, the supply of power may be removed from heating elements 830 and/or electromagnet 702. For example, power may be removed from heating elements 830 when lever 116 and/or elevator 832 is moved (e.g., moved in an upward direction) from its downward-most position. One or more triggers may release lever 116 from its downward-most position. For example, if the cancel button 110 is actuated and/or micro-switch 108 is actuated lever 116 may be removed from its downward-most position. Lever 116 may be manually moved from its downward-most position. Power may be manually removed (e.g., by pulling the electrical cord of toaster 100 from a power outlet) from toaster 100, which may remove power from electromagnet 702 and thereby cause lever 116 to be moved from its downward-most position.

The above triggers releasing lever 116 from its downward-most position may send an indication to one or more components of a PCB (such as microprocessor 1616) to cease power to electromagnet 702, heating elements 830, etc. For example, when cancel button 110 and/or micro-switch 108 is actuated, an indication may be sent to microprocessor (e.g., microprocessor of power PCB 718 and/or control PCB 710) to cease power to electromagnet 702, heating elements 830, etc. In examples, the cessation of power to electromagnet 702 may allow lever 116 to be released from the bottom-most position of toaster 100. When lever 116 is no longer in the bottom-most position, electrical contacts connected to a circuit board (e.g., control PCB 710) may be opened (e.g., in an opened state). A signal may be provided to one or more microprocessors indicating that the electrical contacts may be opened. The signal may be sent to microprocessor of power PCB 718, which may result in power not being provided to one or more components of toaster 100, such as heating elements 830.

In examples, the one or more triggers may indicate (e.g., independently indicate) to heating elements 830 that power is to be removed from heating elements 830. For example, if the cancel button 110 is actuated and/or micro-switch 108 is actuated, an indication may be sent to heating elements 830 that power should be removed from heating elements 830. The indication that power should be removed from heating elements 830 may derive from power PCB 718 and/or control PCB 710 (e.g., microprocessors of power PCB 718 and/or control PCB 710). The indication that power should be removed from heating elements 830 may be separate and independent from lever 116 moving in an upward direction.

FIG. 17 is a block diagram of an example device 1600 for heating and dispensing a foodstuff, such as toaster 100. Toaster 1600 may include one or more components described herein, such as control system 1603, power supply 1602, heating elements 1620, mode select 1604, Microprocessor 1616, Trigger 1606, electromagnet 1614, and/or lever 1612.

Control system 1603 may include one or more of power supply 1602, trigger 1606, and/or electromagnet 1614. Power supply 1602 may be AC power and/or DC power. Power supply 1602 may be internal to toaster 100 and/or external to toaster 100. Power supply 1602 may derive from AC power provided by a power outlet and/or power cord to toaster 100. Power supply 1602 may provide power to one or more components of toaster 1600, such as heating elements 1620, electromagnet 1614, etc., as described herein.

Control system 1603 may include one or more triggers 1606, such as cancel button 1608 and/or micro-switch 1610. Triggers 1606 may send an indication to microprocessor 1616 to cease power to electromagnet 1614, heating elements 1620, etc. For example, when cancel button 1608 and/or micro-switch 1610 is actuated, an indication may be sent to microprocessor 1616 to cease power to electromagnet 1614, heating elements 1620, etc. As described herein, the cessation of power to electromagnet 1614 may allow lever 1612 to be released from the bottom-most position of toaster 100. When lever 1612 is no longer in the bottom-most position, electrical contacts connected to a circuit board (e.g., control PCB 1630 having microprocessor 1616) may be opened. A signal may be provided to microprocessor 1616 indicating that the electrical contacts may be opened, which may remove (e.g., indicate to remove) power from heating elements 1620.

Heating elements 1620 may be used to provide heat (e.g., radiant heat) to the foodstuffs inserted within slots of toaster 100. Heating elements may be heating elements 830. Heating elements 1620 may be actuated upon a lever (e.g., lever 116) being moved to the bottom-most position of toaster 100. There may be one or more heating elements 1620 located on each side of food-receiving slots of toaster 100. Heating elements 1620 may be a wire within toaster 100, such as a nichrome wire. As power is provided, heating elements 1620 (such as the nichrome wire) conducts the electricity, causing heat to be provided by the heating elements 1620. When power is removed from heating elements 1620, electricity stops flowing through the wire, causing heat to not be provided by the heating elements 1620.

Toaster 100 may include one or more mode selections 1604, such as toaster settings, bagel settings, the lightness/darkness settings of the toasting, as well as other mode settings. The settings can be selected via one or more actuators, such as toaster button 112a, bagel button 112b, etc.

Toaster 100 may include lever 1612 (e.g., 116). Lever 1612 may be used to lower a foodstuff from a slot (in which the foodstuff is partially exposed from the toaster) into a chamber of the toaster (in which the foodstuff is completely within the toaster). Lever 1612 may extend from a housing of the toaster or may be contained within or about the toaster. As described herein, upon moving lever 1612 to the bottom-most position of the toaster, a microprocessor (e.g., microprocessor 1616) may receive an indication to power heating elements 1620 and/or electromagnet 1614. Lever 1612 may engage with a retaining portion when moved to a bottom-most portion of toaster. Upon a predetermined period of time or an actuation of a trigger (such as trigger 1606), lever 1612 may be released from retaining portion and lever 1612 may move in an upward position from the downward-most portion of toaster 100. Upon lever 1612 moving in an upward direction, the microprocessor may receive an indication to cease power to heating elements 1620.

Control system 1603 may include electromagnet 1614. Electromagnet 1614 may be a magnet in which the magnetic field is produced by an electric current. Electromagnet 702 may be a solenoid (e.g., an electromagnet solenoid). For example, electromagnet 702 may be a cylindrical coil of wire (e.g., single wire). When an electric current flows through the wire the solenoid may generate a magnetic field. In other examples electromagnet 702 may be a solenoid wound around a central core (e.g., central iron core). The magnetic field of electromagnet 1614 may disappear when the current is turned off, for example, when power supply 1602 no longer provides power to electromagnet 1614.

Figure 18:
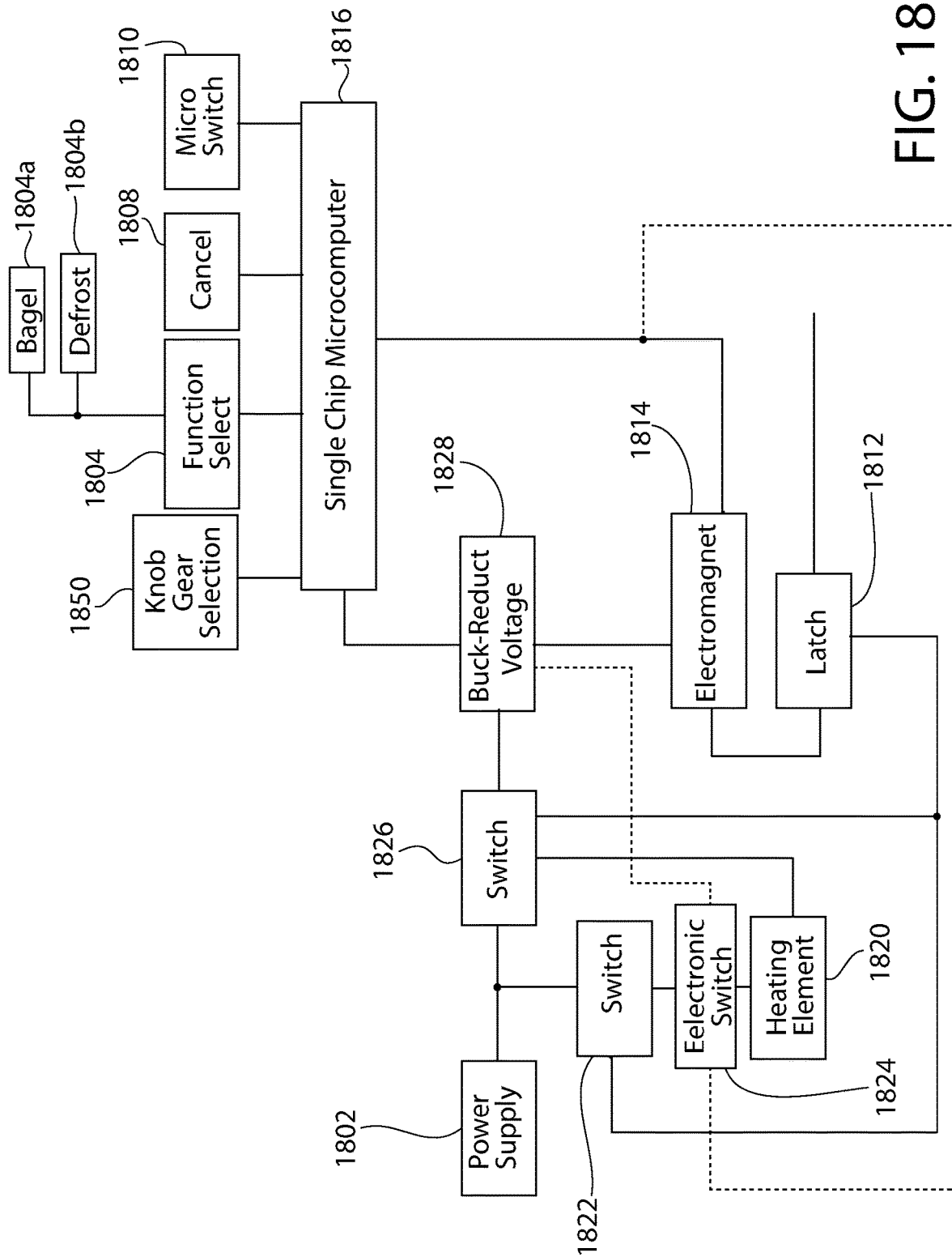
FIG. 18 is another block diagram of an example device for heating and dispensing a foodstuff, as described herein.

FIG. 18 is another block diagram of an example device (e.g., toaster) for heating and dispensing a foodstuff. A user may desire to use the toaster, such as toaster 100, to provide heat (e.g., radiant heat) to a foodstuff. The heat may be provided via one or more heating elements, such as heating element 1820. Heating element 1820 may be actuated via a pressing and/or depressing of a lever, such as latch 1812, of toaster. In order for heating element 1820 to produce heat, heating element 1820 must be connected to a power supply, such as power supply 1802. Power supply 1802 may produce alternative current (AC) power, direct current (DC) power, or a combination of the two. For example, the toaster may receive AC power via an electrical outlet and/or DC power via a battery. In an example, toaster may receive power (e.g., power supply 1802) via a cord when the cord is plugged into an electrical outlet.

The user may move latch 1812 in one or more directions, such as in a downward direction. When the latch 1812 is pressed in a downward direction, and the toaster is connected to power supply 1802, an electrical circuit may be formed between power supply 1802 and heating element 1820. For example, when the latch 1812 is pressed down, and the toaster is connected to power supply 1802, switch 1822 and/or switch 1826 may be closed, thereby forming an electric circuit between power supply 1802 and heating element 1820.

Pressing latch 1812 in a downward direction may also, or alternatively, cause power (e.g., from power supply 1802) to be provided to electromagnet 1814. In an example, power may travel from power supply 1802 through switch 1826 and buck voltage regulator 1828 before reaching electromagnet 1814. Buck voltage regulator 1828 may step down the voltage from power supply 1802 so that components of toaster may receive (e.g., safely receive) the power. For example, buck voltage regulator 1828 may step down the voltage so that approximately 24 volts reach electromagnet 1814 and approximately 5 volts reach microcomputer 1816. Microcomputer 1816 may be one or more microcomputers 1616, in some examples.

Electromagnet 1814 may produce a magnetic field when it receives power. For example microcomputer 1816 may send a work signal to electromagnet 1814 and electronic switch 1824 for electromagnet 1814 to begin producing a magnet field. The signal (e.g., same signal) may be sent to electromagnet 1814 and electronic switch 1824 at the same time. When electromagnet 1814 and electronic switch 1824 receive the signal, electromagnet 1814 and electronic switch 1824 may form the circuit (e.g., close the circuit) so that power may be provided to heating element 1820. Electromagnet 1814 may hold latch 1812 into position (e.g., a downward position) and electronic switch 1824 may close (e.g., to form the circuit loop). As described herein, portions of latch 1812 and/or portions coupled to latch 1812 may be comprised of ferromagnetic material that may be attracted to the magnetic field of electromagnet 1814. As a result, electromagnet 1814 may retain the latch 1812 (e.g., in a down position) when electromagnet 1814 receives power from power supply 1802. Electromagnet 1814 may retain the latch 1812 in a down position for a predetermined period of time, or until an event occurs, as described herein.

Power may be removed from heating element 1820 and/or electromagnet 1814 in one or more ways. For example, latch 1812 moving in an upward direction may cause power to be removed from heating element 1820 and/or electromagnet 1814. Latch 1812 moving in an upward direction may open an electrical circuit formed between power supply 1802 and heating element 1820. For example, when latch 1812 moves in an upward direction, switch 1822 and/or switch 1826 may be opened, thereby opening an electric circuit between power supply 1802 and heating element 1820 and preventing power from being provided from power supply 1802 to heating element 1820.

Latch 1812 may be caused to move in an upward direction in one or more ways. For example, latch 1812 may be caused to move in an upward direction when electromagnet 1814 loses power and thus stops producing a magnetic field. Electromagnet 1814 may lose power via a timer, such as a timer provided by microcomputer 1816. For example, microcomputer 1816 may count the time and send a signal (e.g., stop working signal) to electromagnet 1814 and electronic switch 1824 when a predefined time expires. The signal (e.g., the same signal) may be sent to electromagnet 1814 and electronic switch 1824, for example, at the same time. When electromagnet 1814 and electronic switch 1824 receive the signal to stop working, electromagnet 1814 and electronic switch 1824 may disconnect (e.g., open) the circuit loop which may cause heating element 1820 to lose power. Electromagnet 1814 may release latch 1812 and electronic switch 1824 may open to break the circuit loop. As an example, a timer may begin a countdown when the latch 1812 is first pressed down. The electromagnet 1812 may lose power upon the expiration of the timer.

Microcomputer 1816 may count down the time to send a signal to stop working when micro switch 1810 is triggered or when cancel button 1808 is triggered. Micro switch 1810 may be triggered, for example, when the toaster lid is placed on toaster or when micro switch 1810 is manually pushed down. In other examples, electromagnet 1814 may lose power upon power being removed from toaster (e.g., via the electrical cord of toaster being removed from the electrical outlet, via latch 1812 being manually moved in an upward direction, etc.).

When cancel button 1808 and/or microswitch 1810 are triggered, a signal may be transmitted to microcomputer 1816. The signal may include an indication that power to electromagnet 1814 should cease immediately or should cease in a predetermined amount of time. Based on the signal received from cancel button 1808 and/or microswitch 1810, microcomputer 1816 may send a signal indicating that power should no longer be provided to electromagnet 1814 such that electromagnet 1814 ceases providing a magnetic field.

Microcomputer 1816 may directly send a signal to electromagnet 1814, although in other examples microcomputer 1816 may send a signal to one or more other components of toaster so that power is no longer provided to electromagnet 1814. For example, the electromagnet 1814 may receive a signal from the microcomputer 1816 directly. A signal (e.g., a signal to stop working) may be sent to electronic switch 1824. The same signal to stop working may be sent to electromagnet 1814 and electronic switch 1824. In examples electromagnet 1814 may cease working when electromagnet 1814 receives the signal to stop working. In other examples (e.g., if electromagnet 1814 does not react to the signal to stop working), electromagnet 1814 may lose power when electronic switch 1824 receives the signal to stop working and electronic switch 1824 breaks the circuit.

As described herein, electromagnet 1814 stops producing a magnetic field when electromagnet 1814 loses power. When electromagnet 1814 stops producing a magnet field, latch 1812 is released from its downward-most position and begins to move in an upward direction. When latch 1812 moves in an upward direction, the electric circuit between power supply 1802 and heating element 1820 is opened via switch 1822 and/or switch 1826. In other examples, circuit may not be closed when latch 1812 is in a down position (e.g., manually held in a down position) provided electronic switch 1824 is not activated for forming the circuit loop, as described herein. Upon the opening of the electric circuit, power is no longer provided from power supply 1802 to heating element 1820.

Toaster may include a function (e.g., mode) select 1804. For example, toaster may include a button for heating foodstuffs in one or more different modes. For example, a user may select that a bagel be toasted (via bagel 1804*a*), that a foodstuff be defrosted (via defrost 1804*b*), etc. Toaster may include knob gear selection 1850. Knob gear selection 1850 may be a knob used for selecting how well the foodstuff may be made. Knob gear selection 1850, bagel button 1804*a*, and/or defrost button 1804*b* may be used alone or in combination.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention.

The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A toaster device comprising:
   a toaster body comprising:
      a housing having a top outer surface, a bottom outer surface, and a side outer surface extending between the top and bottom outer surfaces;
      a bread slot in the top outer surface of the housing through which a bread can pass;
      a heating chamber in the housing below the bread slot;
      a heating element configured to generate heat in the heating chamber when receiving power from a power supply;
      an elevator assembly comprising an elevator positioned in the heating chamber for supporting the bread, the elevator movable along an elevator axis between a raised position in which the bread at least partially protrudes through the bread slot and a lowered position in which the bread is fully below the bread slot; and
      a control system comprising the power supply and a switch configured to cut power to the heating element when in a cut-power state;
   a toaster cover comprising an actuation element; and
   the toaster cover alterable between: (1) a detached state in which the toaster cover is separated and remote from the toaster body; and (2) an assembled state in which the toaster cover rests atop the toaster body to cover the bread slot and the actuation element of the toaster cover actuates the switch into the cut-power state.

2. The toaster device according to claim 1 wherein the toaster cover comprises a tray body comprising a basin floor and a basin wall extending from the basin floor to collectively define a basin.

3. The toaster device according to claim 2 wherein the basin wall forms a continuous wall that circumscribes the basin floor.

4. The toaster device according to claim 2 further comprising:
   the housing of the toaster body comprising a shoulder in the side outer surface that circumscribes the housing, the shoulder separating the housing into an upper portion located above the shoulder and a lower portion located below the shoulder; and
   wherein, in the assembled state, a distal edge of the basin wall contacts the shoulder of the housing of the toaster body and the upper portion of the housing of the toaster body extends into the basin.

5. The toaster device according to claim 2 further comprising:
   the basin wall comprises an inner wall surface and an outer wall surface; and
   wherein, in the assembled state, the outer wall surface of the basin wall is substantially flush with the side outer surface of the toaster body.

6. The toaster device according to claim 2 further comprising:
   the actuation element of the toaster cover comprising a first protuberance extending from the basin floor;
   the top outer surface of the housing of the toaster body comprising an aperture; and
   the switch comprising a switch actuator located below and aligned with the aperture along a switch axis.

7. The toaster device according to claim 6 wherein the basin wall extends a first height from the basin floor and the first protuberance extends a second height from the basin floor, the first height being greater than the second height.

8. The toaster device according to claim 6 further comprising:
   the switch actuator alterable between a raised position and a lowered position by moving along the switch axis, the lowered position of the switch actuator corresponding to the cut-power state of the switch, and the switch actuator biased into the raised state position by a resilient element of the switch; and
   wherein the resilient element of the switch is configured so that the weight of the toaster cover in the assembled state overcomes the biasing force of the resilient element.

9. The toaster device according to claim 6 wherein the switch axis is substantially parallel to the elevator axis.

10. The toaster device according to claim 6 wherein the first protuberance of the toaster cover moves in a direction along the switch axis as the toaster cover is altered from the detached state to the assembled state.

11. The toaster device according to claim 1 further comprising:
    the toaster cover comprises a transverse cross-sectional profile having a major axis and a minor axis that is shorter than the major axis;
    the toaster cover configured so that the toaster cover can be positioned into the assembled state in only a first rotational orientation and a second rotational orientation that is different than the first rotational orientation; and
    the actuation element comprising: (1) a first protuberance located on the toaster cover so that when the toaster cover is in the assembled state in the first rotational orientation, the first protuberance actuates the switch into the cut-power state; and (2) a second protuberance located on the toaster cover so that when the toaster cover is in the assembled state in the second rotational orientation, the second protuberance actuates the switch into the cut-power state.

12. The toaster device according to claim 1 wherein the toaster cover is formed of a plastic.

13. The toaster device according to claim 1 further comprising:
    the elevator assembly further configured to electrically couple the heating element to the power supply when the elevator is in the lowered position and decouple the heating element from the power supply when the elevator is in the raised position;

the control system further configured to return the elevator from the lowered position to the raised position when the switch is in the cut-power state.

14. The toaster device according to claim 13 further comprising:
the elevator assembly comprising a resilient element that biases the elevator into the raised position;
a first latch component alterable between a locked state that locks the elevator in the lowered position and an unlocked state that releases the elevator to return to the raised position from the lowered position; and
the control system further configured to alter the first latch component between the locked state when the switch is not in the cut-power state and the unlocked state when the switch is in the cut-power state.

15. The toaster device according to claim 14 wherein the elevator assembly further comprises a second latch component that operably cooperates with the first latch component.

16. The toaster device according to claim 14 further comprising:
the control system further comprising an electromagnetic solenoid;
the first latch component comprises a ferromagnetic element;
the electromagnetic solenoid configured to exert a first magnetic field that acts upon the ferromagnetic element to cause the first latch component to be in the locked state when receiving a first amount of power from the power supply.

17. The toaster device according to claim 16 wherein the control system is further configured to: (1) provide the first amount of power to the electromagnetic solenoid from the power supply in a normal operation state of the toaster device; and (2) reduce power supplied to the electromagnetic solenoid to an amount below the first amount of power so that the first magnetic field is reduced and the first latch component assumes the unlocked state.

18. A toaster device comprising:
a toaster body comprising:
a housing;
a bread slot in the housing through which a bread can pass;
a heating chamber in the housing below the bread slot;
a heating element configured to generate heat in the heating chamber when receiving power from a power supply;
an elevator assembly comprising an elevator positioned in the heating chamber for supporting the bread, the elevator movable between a raised position and a lowered position, the elevator assembly configured to electrically couple the heating element to the power supply when the elevator is in the lowered position and decouple the heating element from the power supply when the elevator is in the raised position; and
a control system comprising the power supply and a switch alterable between a normal state and a cut-power state, the control system further configured to return the elevator from the lowered position to the raised position when the switch is in the cut-power state;
a toaster cover comprising an actuation element; and
the toaster cover alterable between: (1) an open state in which the toaster cover does not obstruct access to the bread slot; and (2) a closed state in which the toaster cover covers the bread slot and the actuation element of the toaster cover actuates the switch into the cut-power state.

19. A toaster device comprising:
a toaster body comprising:
a housing having a top outer surface, a bottom outer surface, and a side outer surface extending between the top and bottom outer surfaces;
a bread slot in the top outer surface of the housing through which a bread can pass;
a heating chamber in the housing below the bread slot;
a heating element configured to generate heat in the heating chamber when receiving power from a power supply;
an elevator assembly comprising an elevator positioned in the heating chamber for supporting the bread, the elevator movable between a raised position and a lowered position;
a toaster cover comprising a tray body comprising a basin floor having an upper surface and a basin wall extending from the upper surface of the basin floor and circumscribing the basin floor to collectively define a basin, wherein the basin floor is devoid of any apertures or holes; and
the toaster cover alterable between: (1) a serving tray state in which the toaster cover is separated and remote from the toaster body; and (2) an assembled state in which the toaster cover rests directly atop the toaster body and covers the bread slot so that the basin wall is in direct contact with the housing of the toaster body and the upper surface of the basin floor faces the top outer surface of the housing; wherein the toaster body comprising a control system comprising the power supply and a switch configured to cut power to the heating element when in a cut-power state; the toaster cover comprising an actuation element; and wherein, in the assembled state, the actuation element of the toaster cover actuates the switch into the cut-power state.

* * * * *